Figure 1:
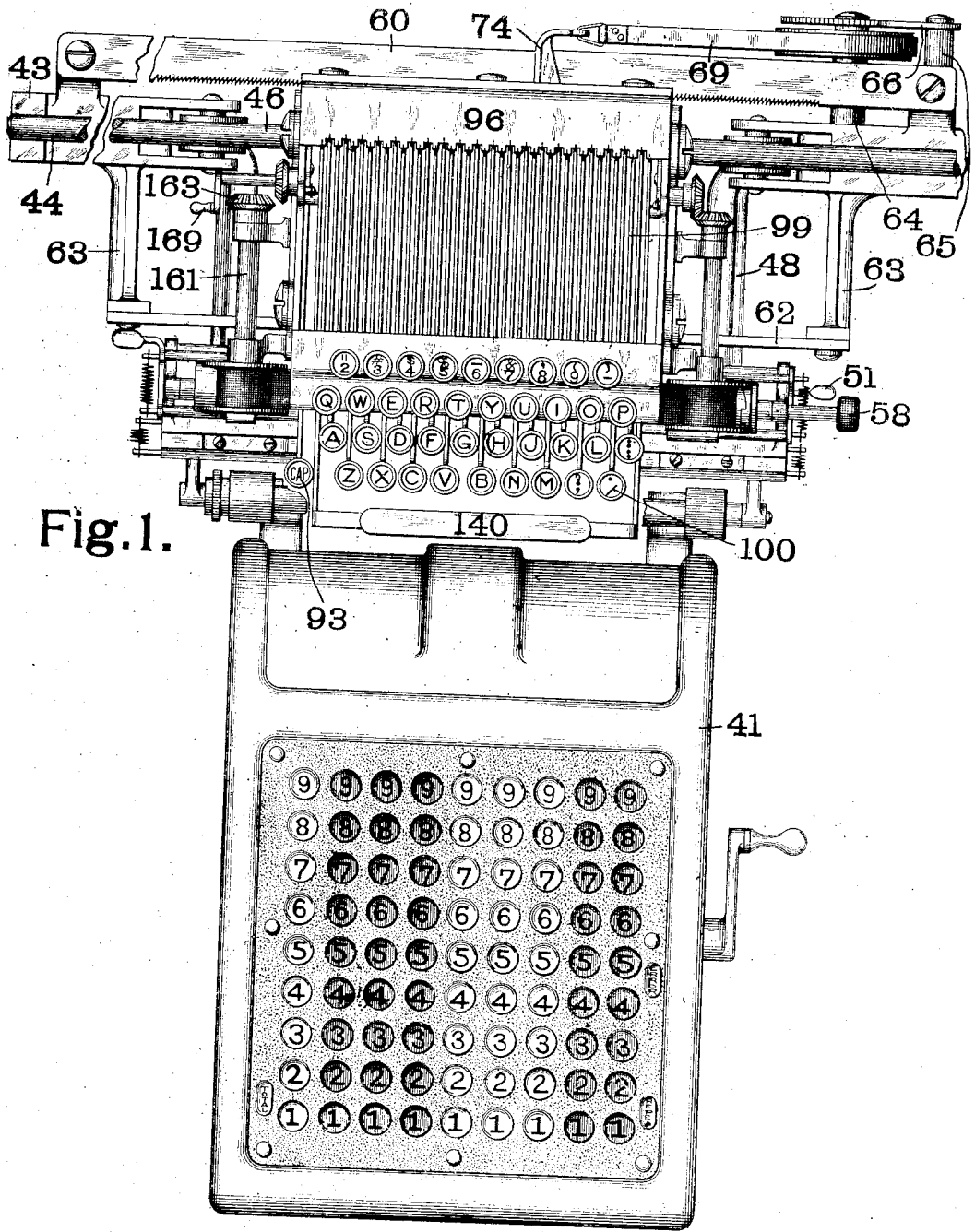

No. 853,297. PATENTED MAY 14, 1907.
E. B. CRAM.
TYPE WRITING ATTACHMENT FOR ADDING MACHINES.
APPLICATION FILED APR. 10, 1906.
15 SHEETS—SHEET 1.

WITNESSES:

INVENTOR
Edwin B. Cram.
BY
ATTORNEYS.

No. 853,297. PATENTED MAY 14, 1907.
E. B. CRAM.
TYPE WRITING ATTACHMENT FOR ADDING MACHINES.
APPLICATION FILED APR. 19, 1906.

15 SHEETS—SHEET 4.

WITNESSES:
Fred C. Henke.
W. H. Alexander.

INVENTOR
Edwin B. Cram.
BY
ATTORNEYS.

No. 853,297. PATENTED MAY 14, 1907.
E. B. CRAM.
TYPE WRITING ATTACHMENT FOR ADDING MACHINES.
APPLICATION FILED APR. 19, 1906.
15 SHEETS—SHEET 11.
Fig. 13.
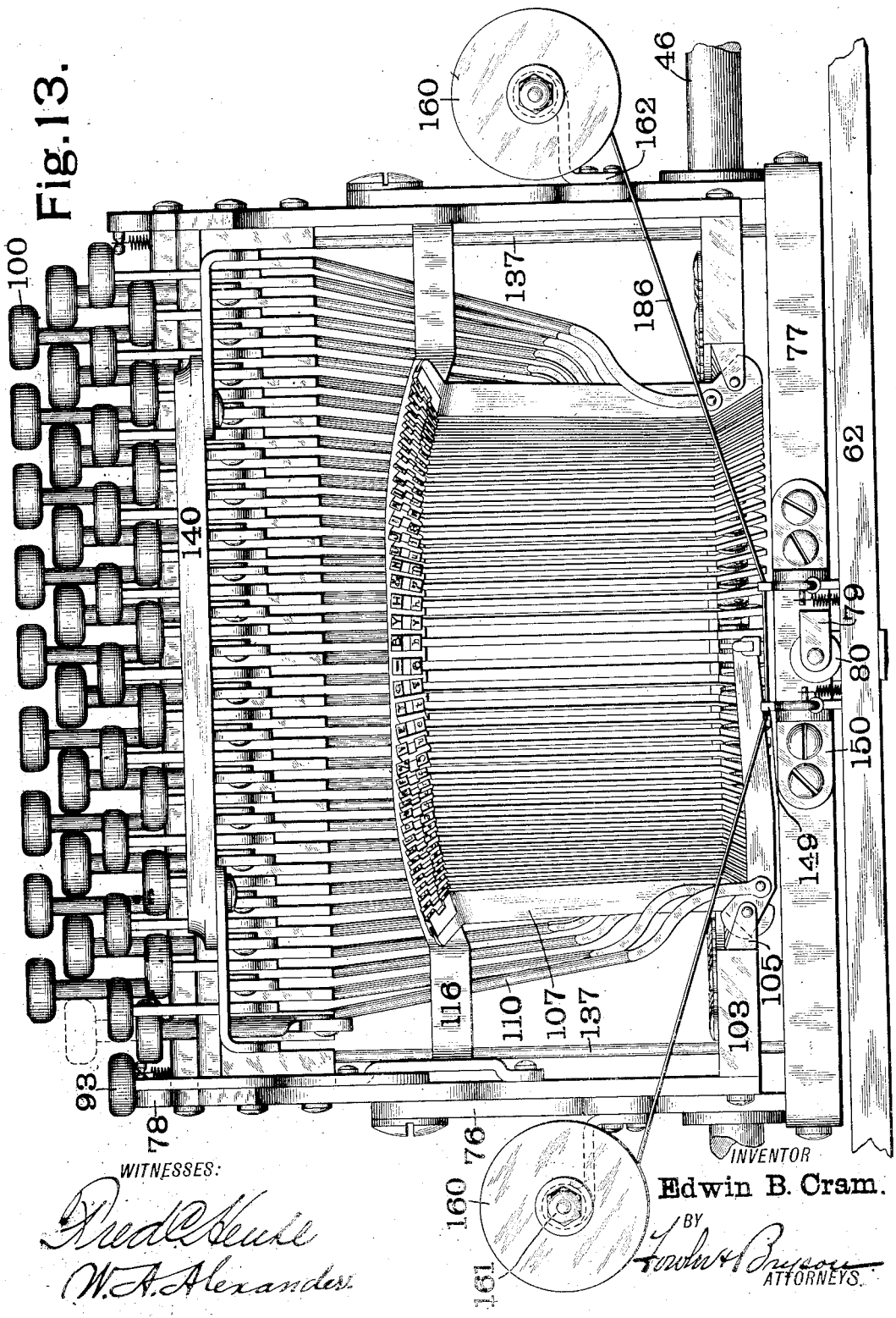
WITNESSES:
INVENTOR
Edwin B. Cram.
BY
ATTORNEYS.

No. 853,297. PATENTED MAY 14, 1907.
E. B. CRAM.
TYPE WRITING ATTACHMENT FOR ADDING MACHINES.
APPLICATION FILED APR. 19, 1906.
15 SHEETS—SHEET 12.
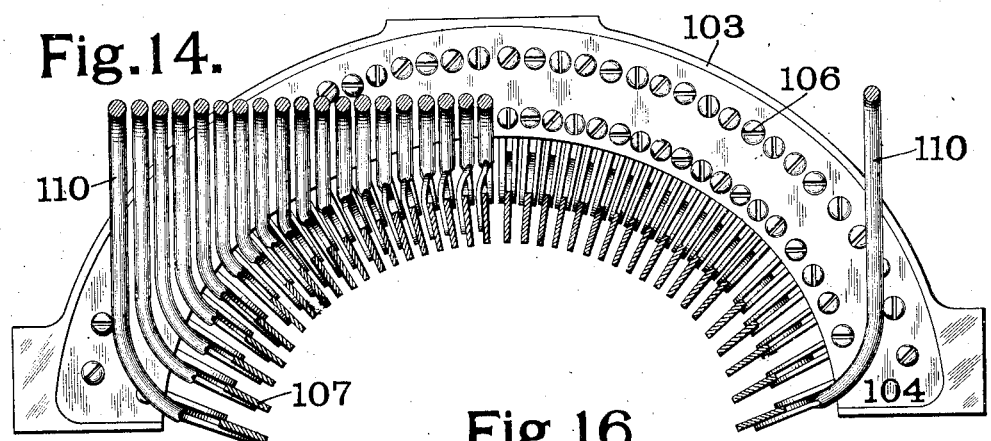
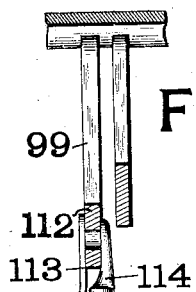
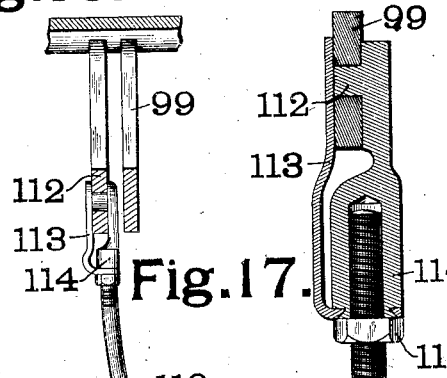
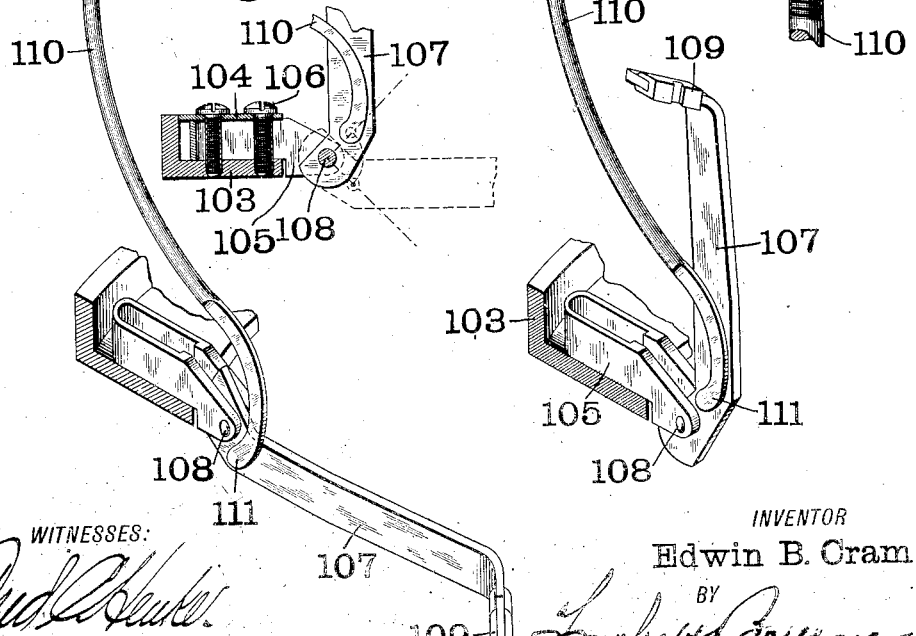
WITNESSES:
INVENTOR
Edwin B. Cram.
BY
ATTORNEYS.

No. 853,297. PATENTED MAY 14, 1907.
E. B. CRAM.
TYPE WRITING ATTACHMENT FOR ADDING MACHINES.
APPLICATION FILED APR. 19, 1906.
15 SHEETS—SHEET 13.
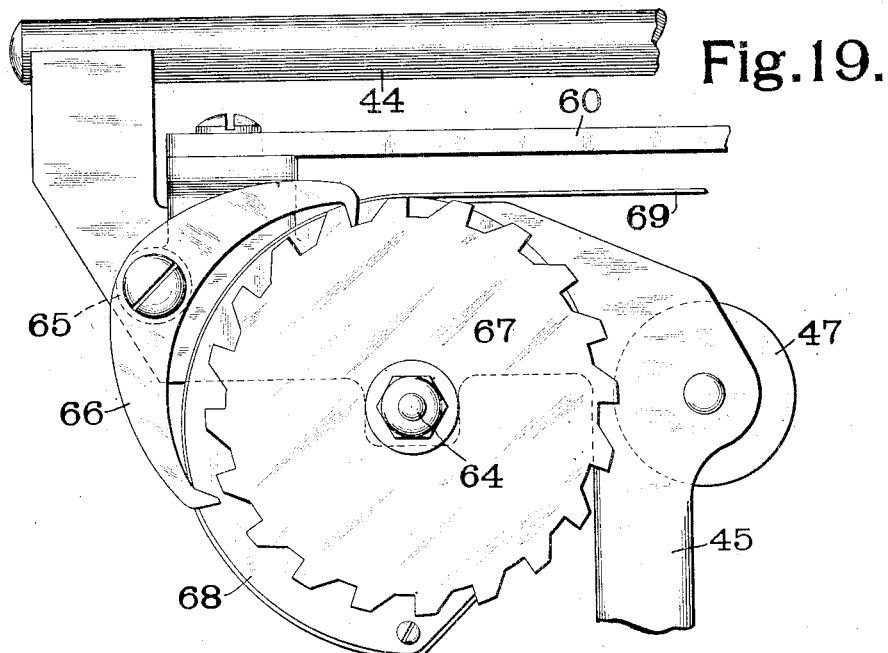
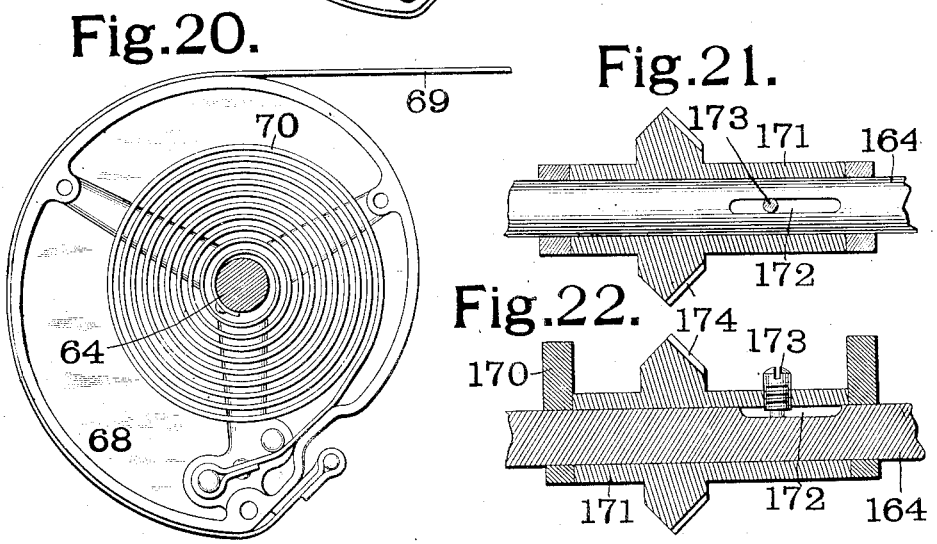
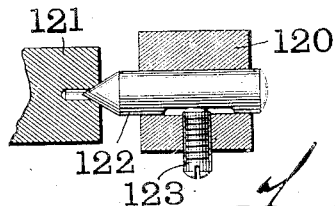
WITNESSES:
INVENTOR
Edwin B. Cram.
BY
Fowler & Bryson
ATTORNEYS.

No. 853,297.  
E. B. CRAM.  
TYPE WRITING ATTACHMENT FOR ADDING MACHINES.  
APPLICATION FILED APR. 19, 1906.  
PATENTED MAY 14, 1907.  
15 SHEETS—SHEET 14.
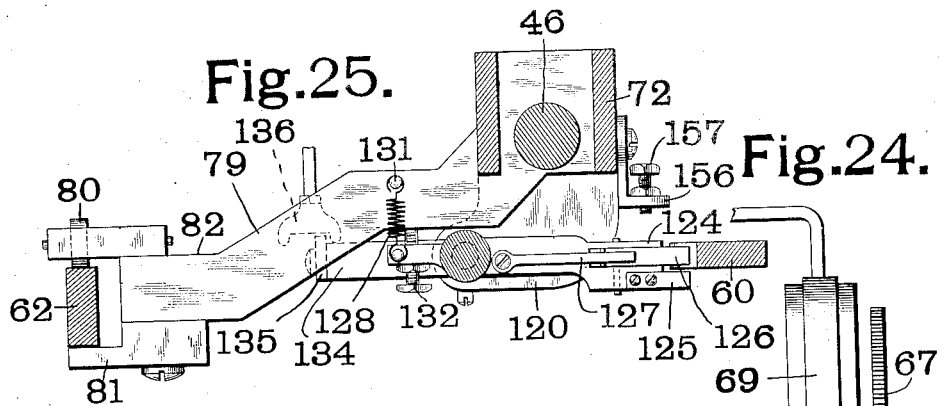
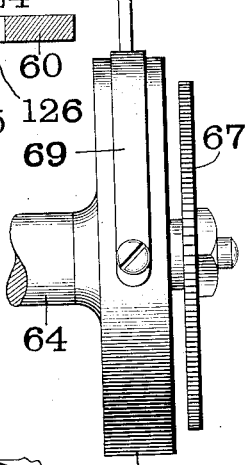
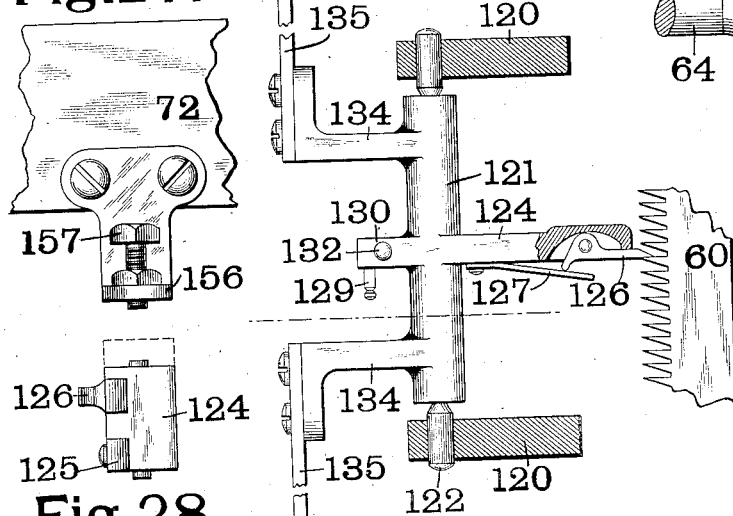
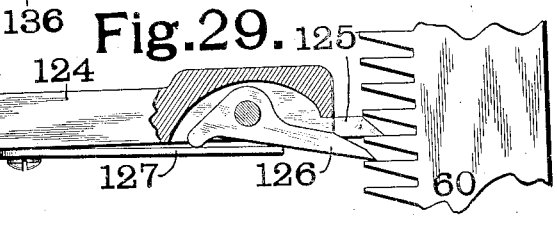
WITNESSES:
INVENTOR  
Edwin B. Cram.  
BY  
ATTORNEYS.

No. 853,297.

E. B. CRAM.

TYPE WRITING ATTACHMENT FOR ADDING MACHINES.

APPLICATION FILED APR. 19, 1906.

PATENTED MAY 14, 1907.

15 SHEETS—SHEET 15.

WITNESSES:
Fred C. Henke.
W. A. Alexander.

INVENTOR
Edwin B. Cram.
BY
Fowler & Bryson
ATTORNEYS.

UNITED STATES PATENT OFFICE.

EDWIN BEECHER CRAM, OF ST. LOUIS, MISSOURI, ASSIGNOR TO CRAM WRITING MACHINE COMPANY, OF ST. LOUIS, MISSOURI, A CORPORATION OF MISSOURI.

TYPE-WRITING ATTACHMENT FOR ADDING-MACHINES.

No. 853,297.     Specification of Letters Patent.     Patented May 14, 1907.

Application filed April 19, 1906. Serial No. 312,674.

*To all whom it may concern:*

Be it known that I, EDWIN BEECHER CRAM, a citizen of the United States, residing at the city of St. Louis, in the State of Missouri, have invented a certain new and useful Type-Writing Attachment for Adding-Machines, of which the following is such a full, clear, and exact description as will enable any one skilled in the art to which it appertains to make and use the same, reference being had to the accompanying drawings, forming part of this specification.

My invention relates to improvements in typewriting attachments for adding machines, and more particularly to that class of attachment shown in Letters Patent No. 761,948, granted to me June 7th, 1904, the general principle and mode of operation in the present attachment being very similar to that in the patent above referred to. In the present instance, however, the typewriting mechanism in place of being operated by a pivoted lever as in the previous application, is operated by keys in a manner similar to the ordinary standard forms of typewriter.

Figure 2:
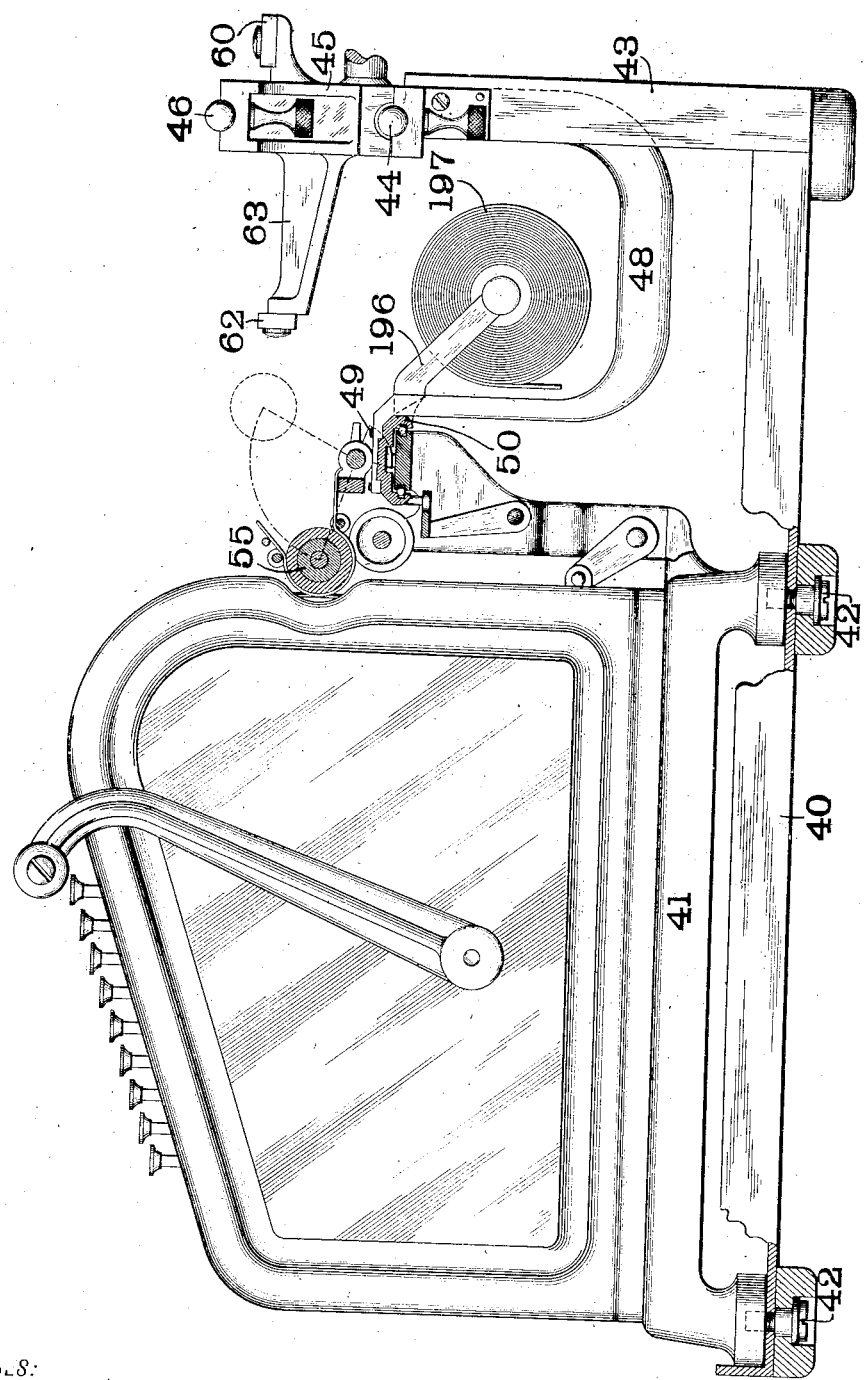
Figure 3:
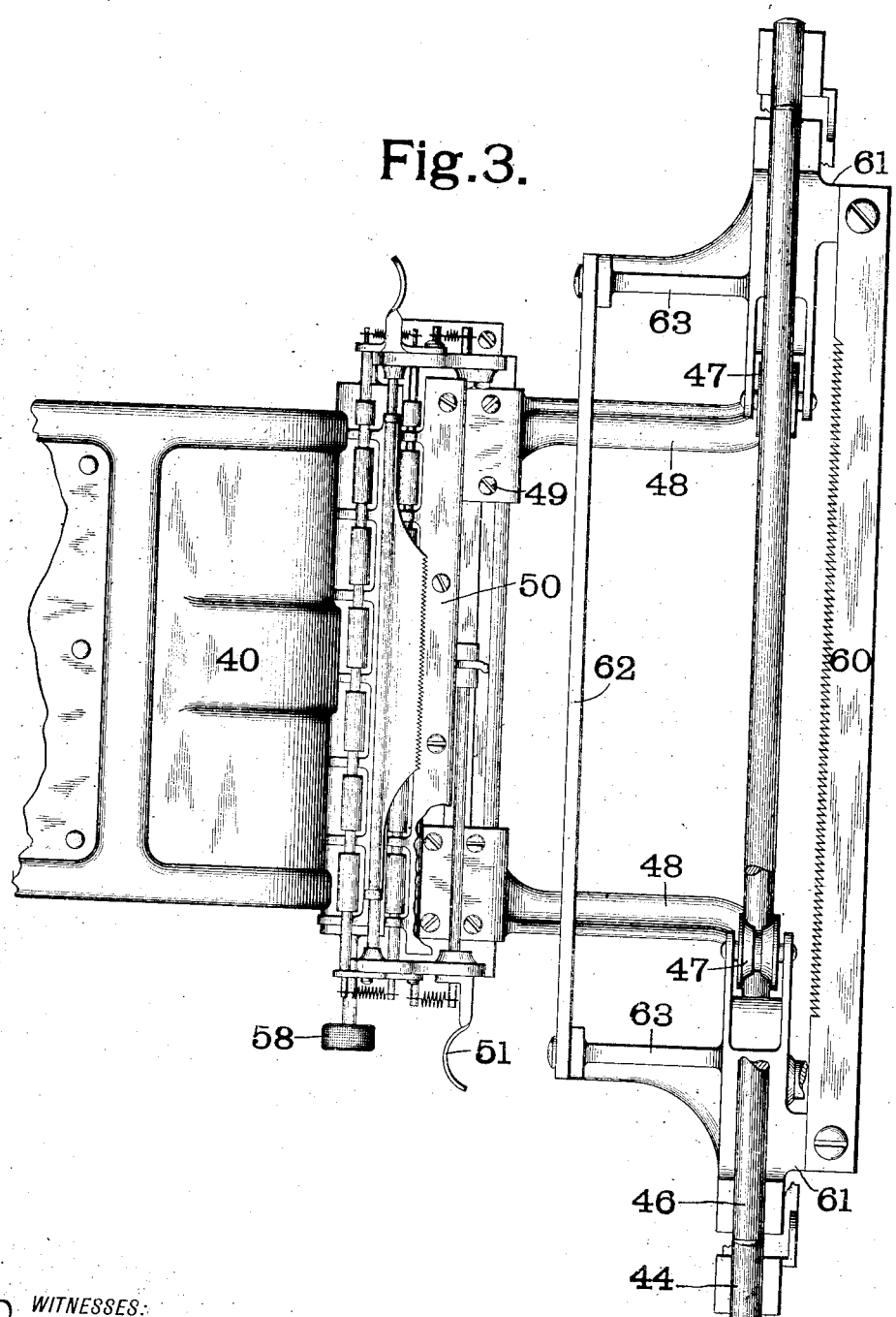
Figure 7:
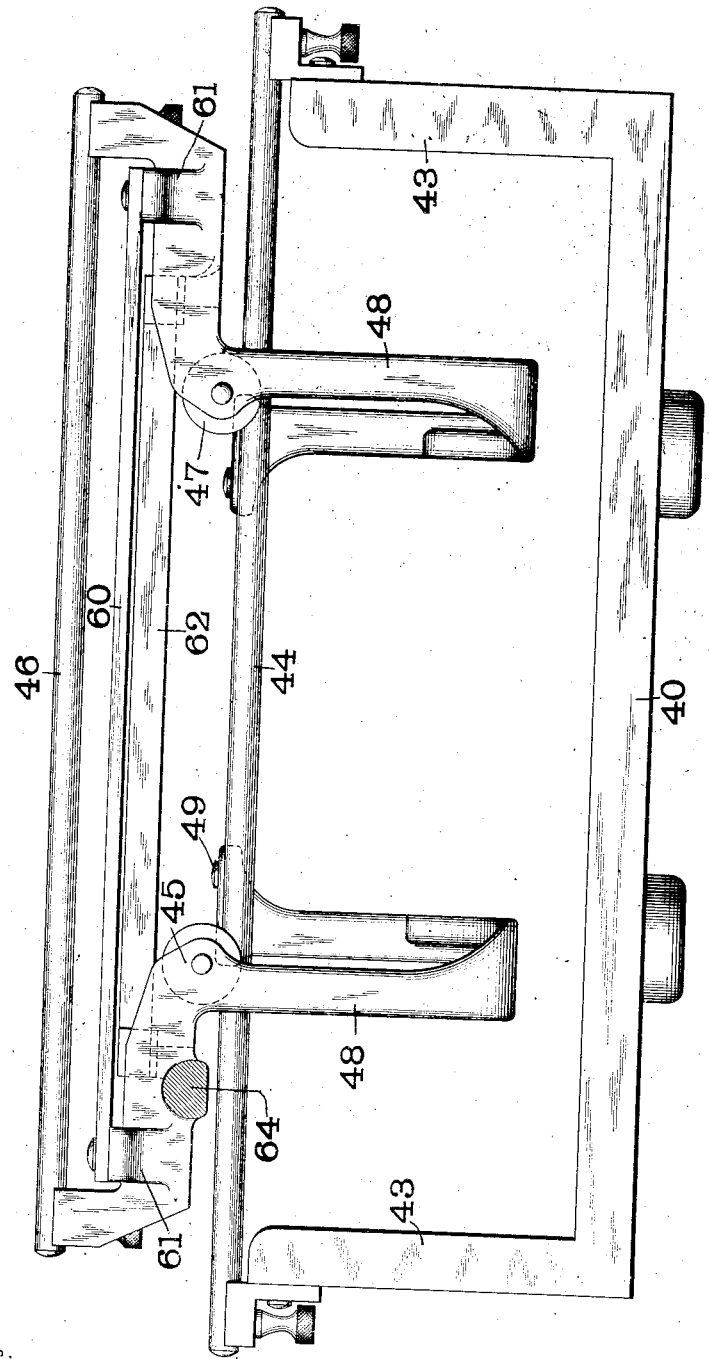
Figure 8:
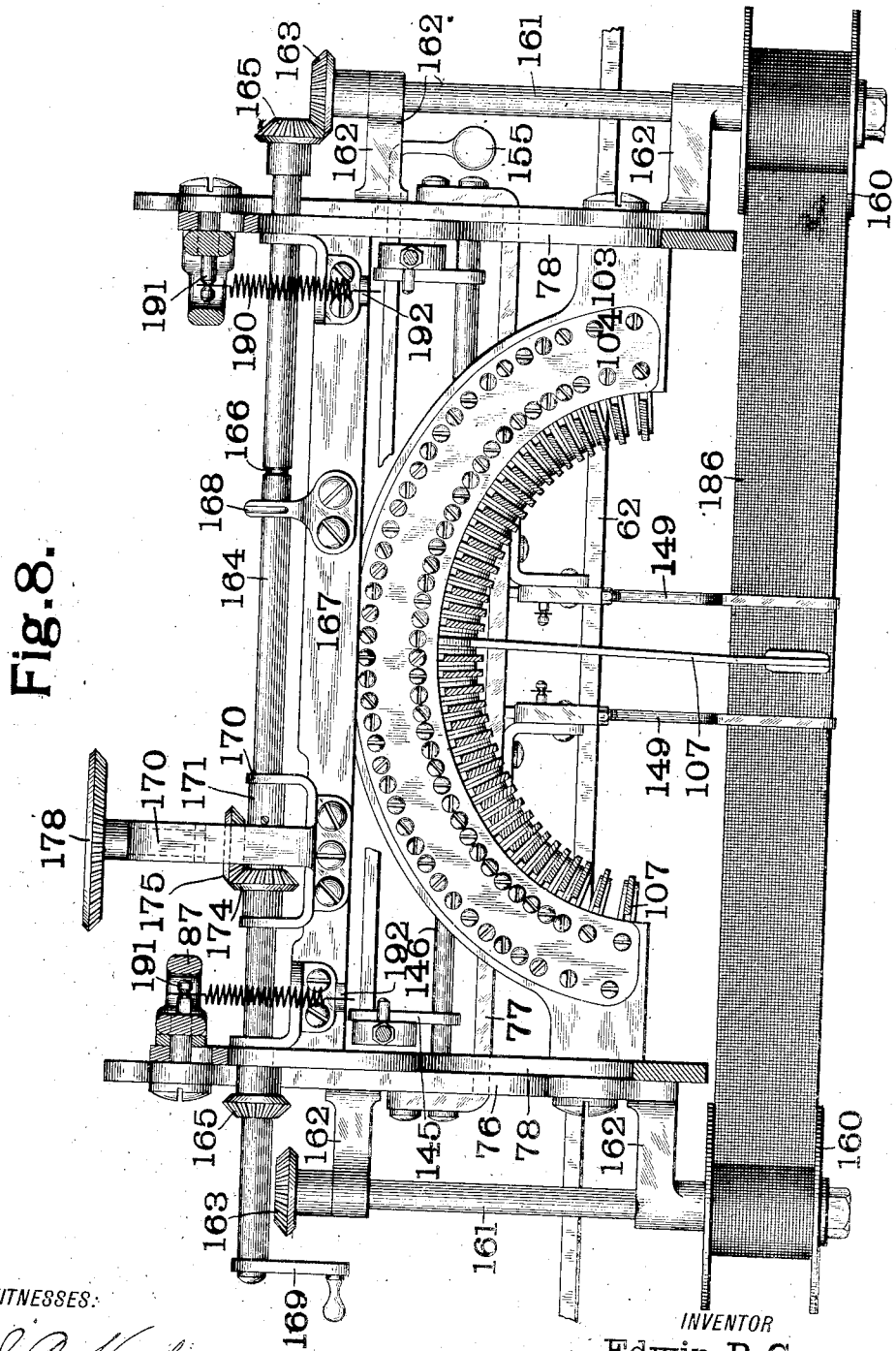
Figure 9:
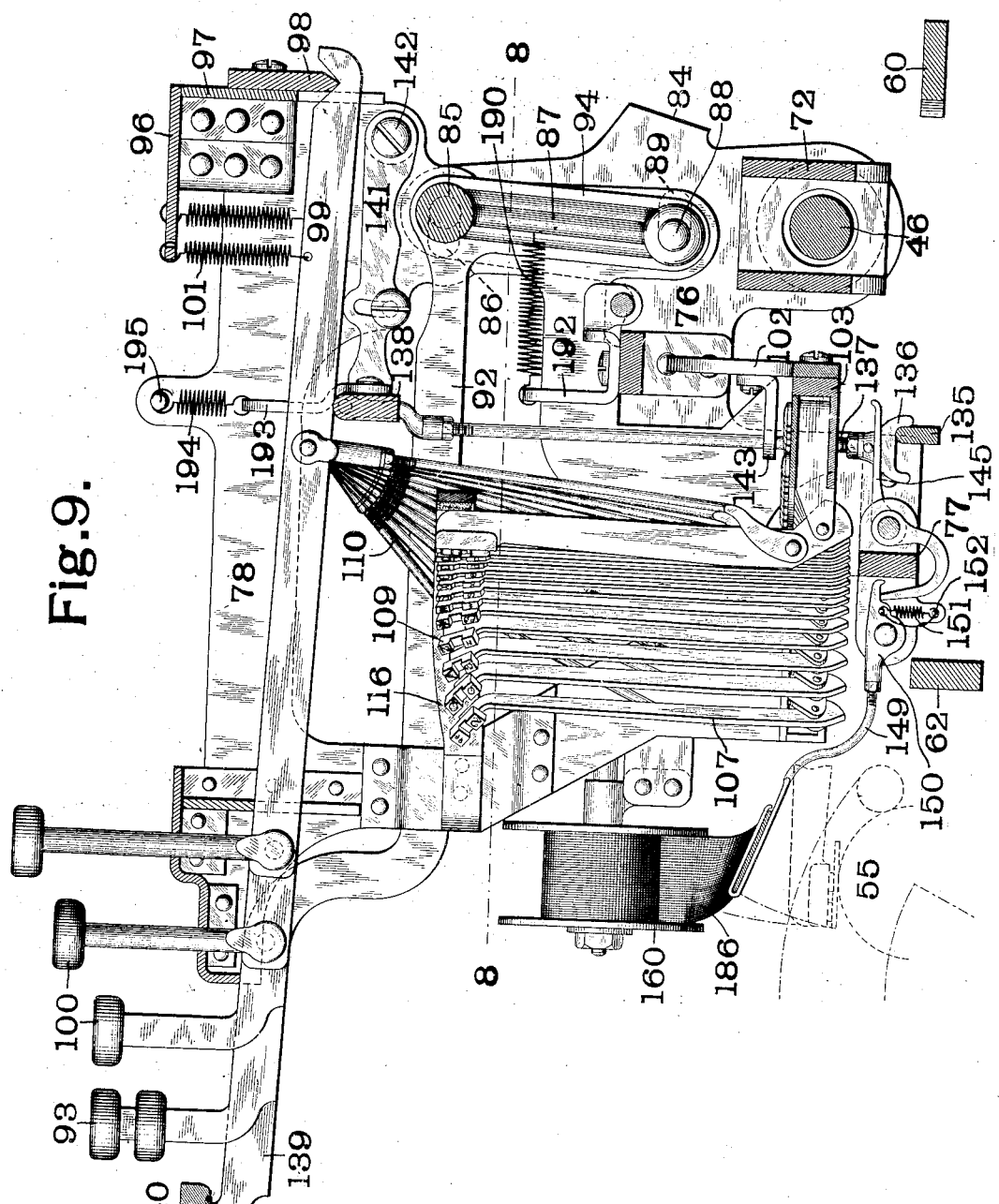
Figure 10:
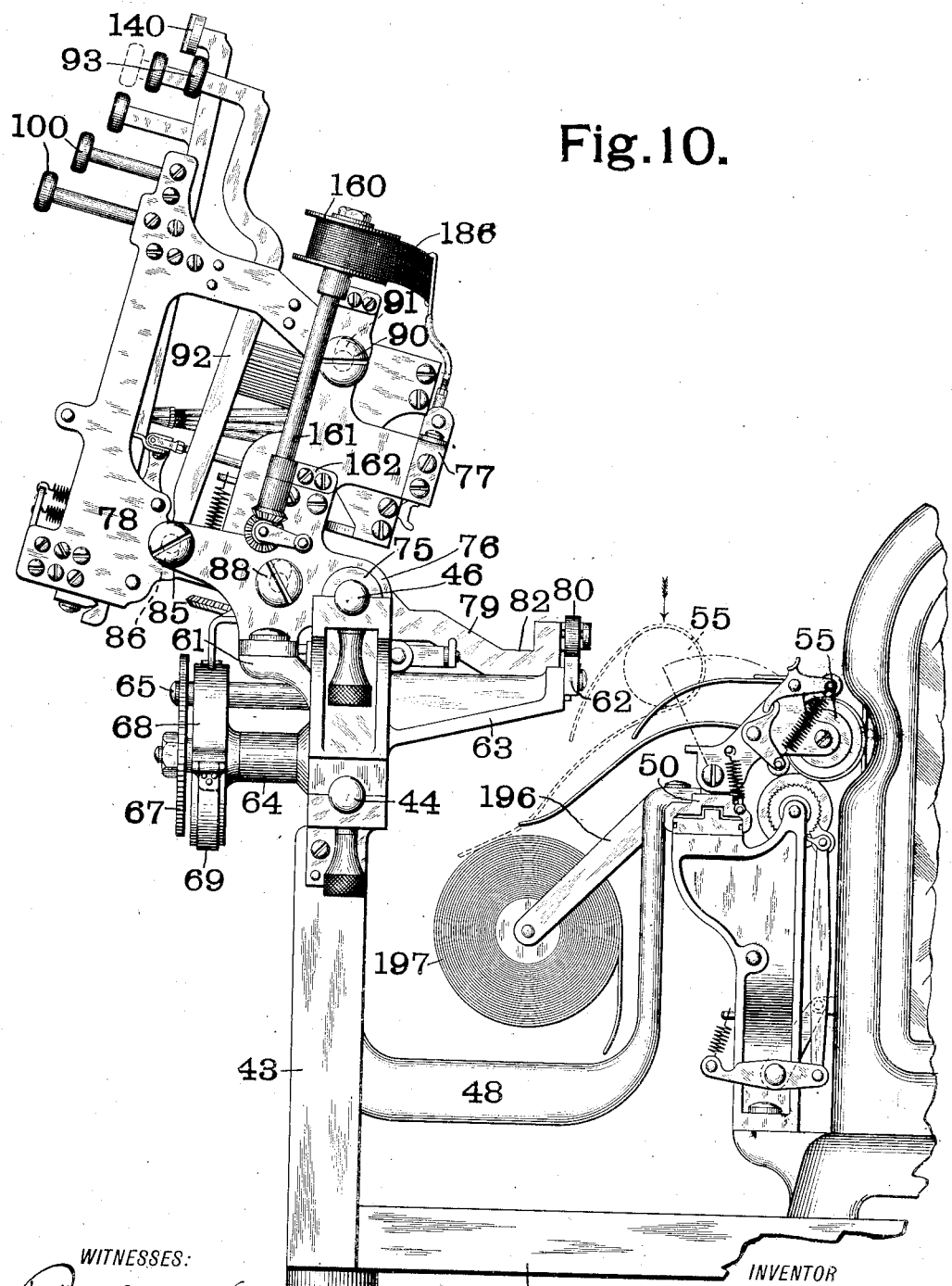
Figure 11:
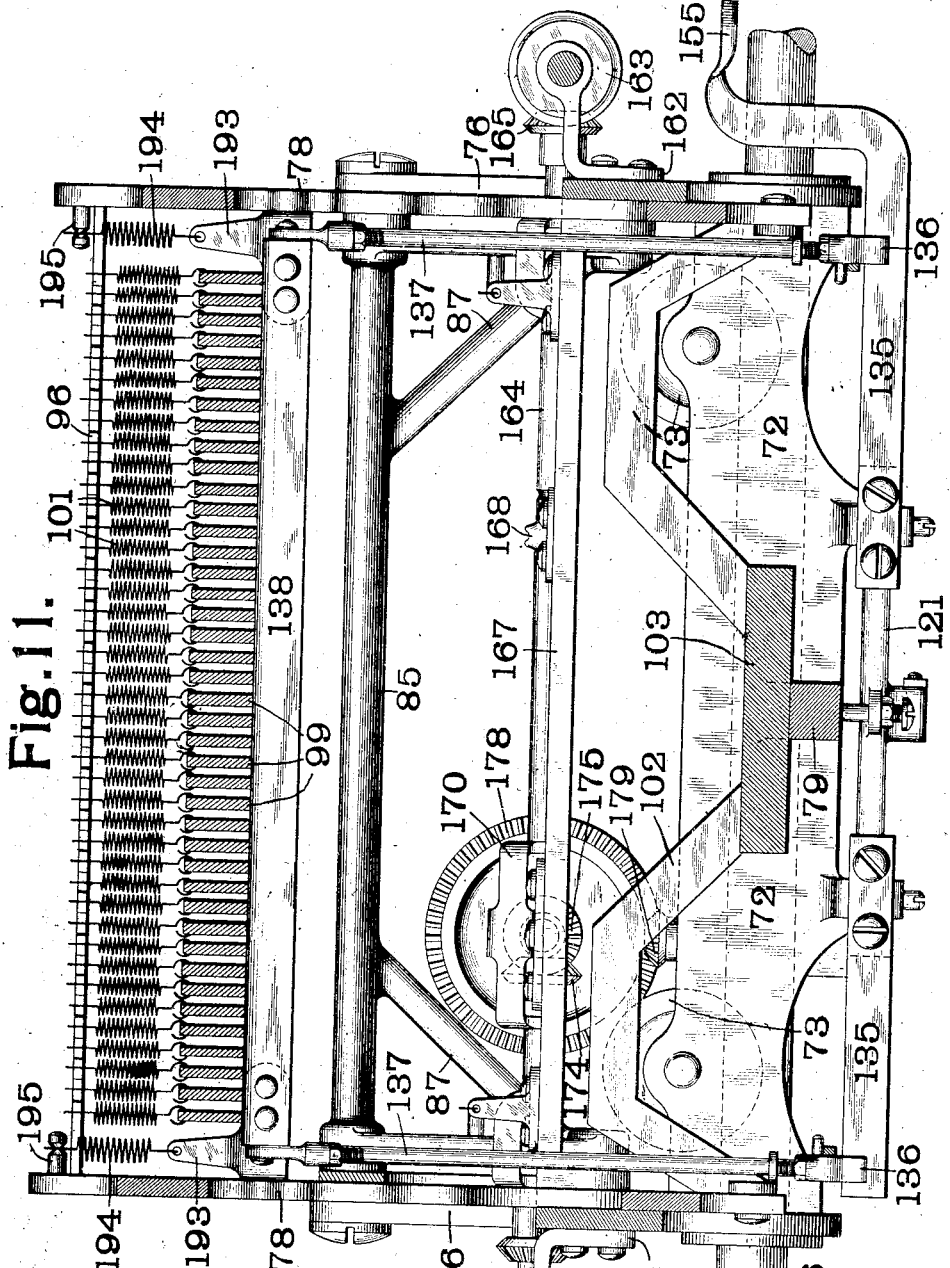
Figure 12:
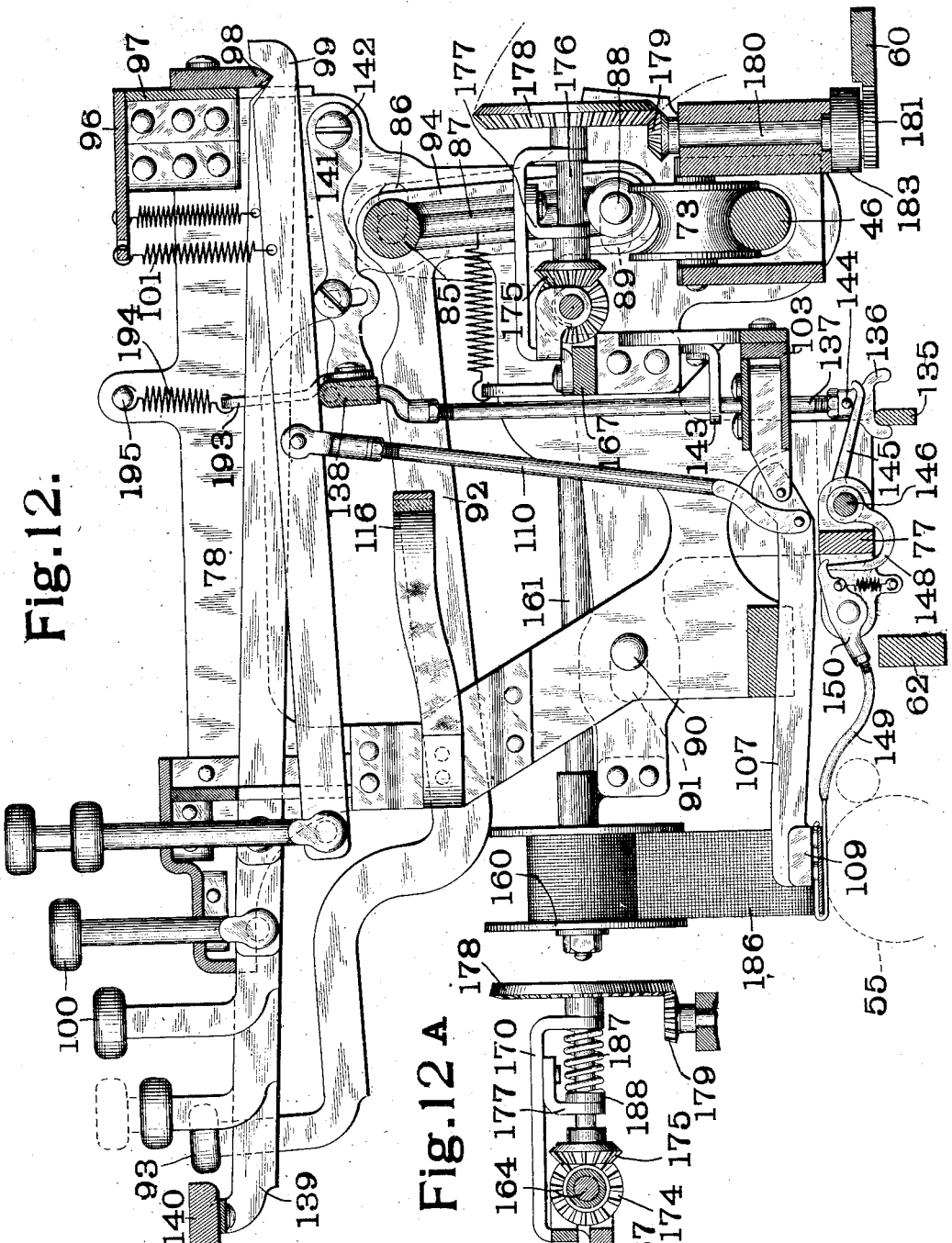
Figure 30:
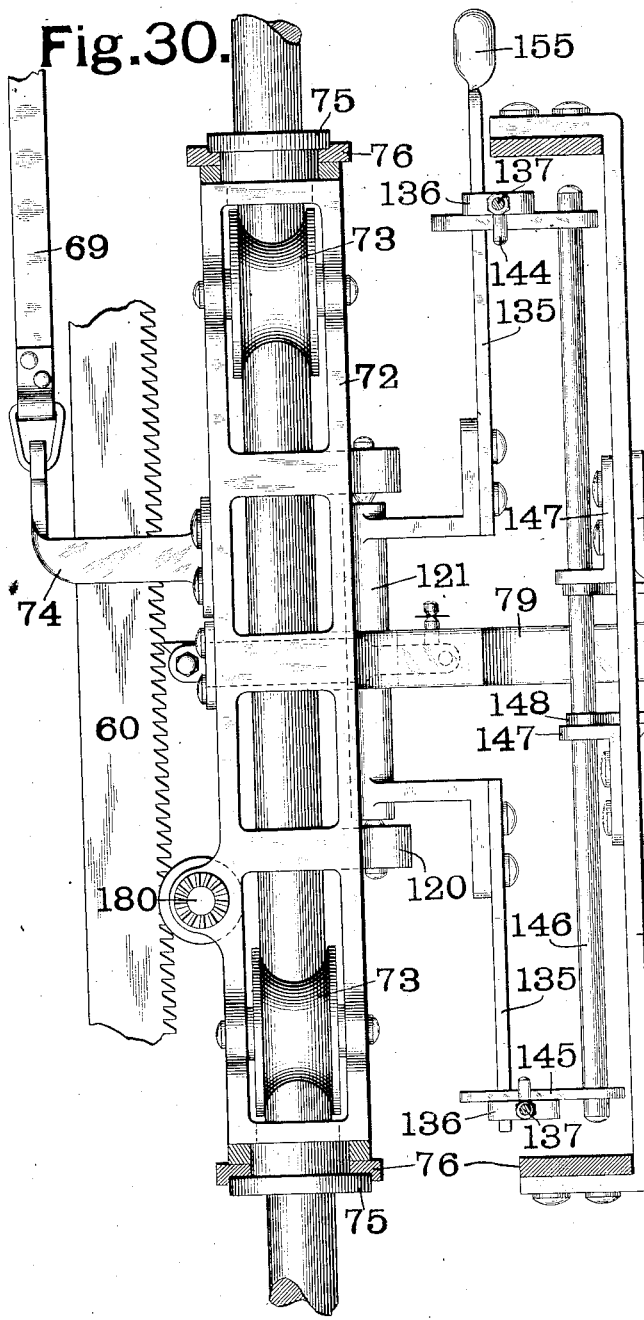
Figure 31:
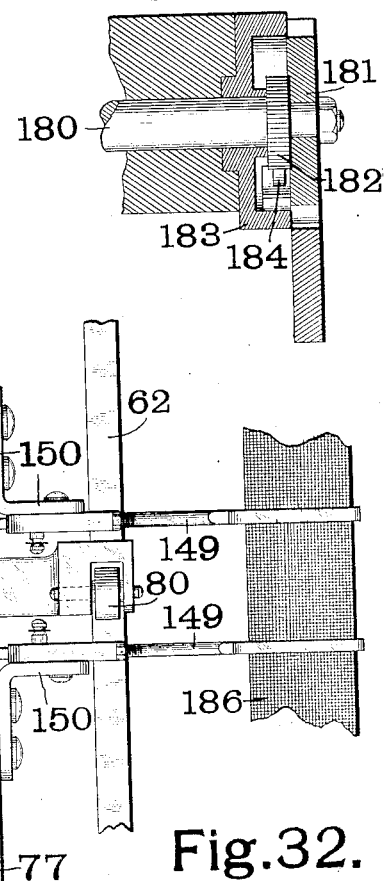
Figure 32:
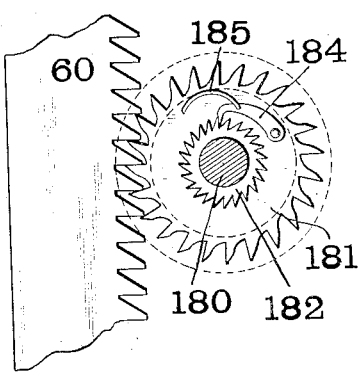

In the accompanying drawings, which illustrate an attachment made in accordance with my invention, together with an adding machine to which the same is applied, Figure 1 is a top plan view on a reduced scale showing substantially the complete mechanism; Fig. 2 is a side view also on a reduced scale, a portion only of the attachment being shown; Fig. 3 is a top plan view of the rear portion of the parts shown in Fig. 2, Figs. 4, 5 and 6 are two end views and a side view respectively, showing the mechanism for controlling the line spacing; Fig. 7 is a rear view of a portion of the framing of the machine; Fig. 8 is a section on the line 8—8 of Fig. 9; Fig. 9 is a vertical central section through the typewriting mechanism proper; Fig. 10 is a side elevation of the typewriting mechanism and a portion of the adding machine, the typewriting mechanism being swung out of normal position; Fig. 11 is a vertical cross-section; Fig. 12 is a vertical section through the typewriting mechanism showing the manner of shifting from lower to upper case; Fig. 12ª is a detail view showing a modification; Fig. 13 is a front elevation showing the arrangement of the type bars and key bars; Fig. 14 is a horizontal section through a portion of the machine showing the arrangement of the type bars; Figs. 15 and 16 are detail views showing the connection between the key bars and type bars; Fig. 16 showing the parts in a different position than Fig. 15; Fig. 17 is an enlarged sectional view of the pivotal connection shown in Figs. 15 and 16; Fig. 18 is a sectional view showing a detail of construction; Figs. 19 and 20 are enlarged detail views of the tension device for the letter spacing; Figs. 21 and 22 are enlarged sectional views of a portion of the ribbon feed mechanism; Fig. 23 is an enlarged sectional view of one of the bearings shown in Fig. 26; Fig. 24 is a side elevation of a portion of the mechanism shown in Fig. 19; Fig. 25 is a sectional view showing the feed pawl for line spacing, together with the mechanism for actuating the same; Fig. 26 is a top plan view of some of the parts shown in Fig. 25; Fig. 27 is an enlarged detail view of one of the limit stops shown in Fig. 25; Fig. 28 is an end view of the feed pawls; Fig. 29 is a top plan view of the feed pawl; Fig. 30 is an enlarged top plan view of the mechanism for controlling the letter spacing, together with some of the mechanism for controlling the ribbon feed, and Figs. 31 and 32 are a vertical section and bottom plan view, respectively, of the ratchet mechanisms for the ribbon feed.

Like marks of reference refer to similar parts in the several views of the drawings.

40 (Fig. 2) represents a base upon which is carried the adding mechanism 41, and the typewriting mechanism to be hereinafter particularly described. The adding mechanism 41 may be of any suitable type. In the drawings I have illustrated the type known as the "Burroughs" adding machine. The adding machine 41 is rigidly secured to the base 40 by means of screws 42. The base 40 extends rearwardly from the adding machine 41 and is provided with uprights 43, which carry a cross-bar or rod 44. This cross-bar rod 44 forms the guide for a laterally movable frame 45 carrying a second bar or rod 46 upon which the typewriting mechanism moves bodily, as will be hereinafter described. The frame 45 is provided with rolls 47, which run upon the bar 44, so as to reduce friction. The frame 45 is provided with two forwardly extending U-shaped arms 48, which are secured by means of screws 49 to the adding machine carriage 50. Owing to this construction, it will be evident that the frame 45 will move in unison with the platen mechanism 50 of the adding machine 41. The frame 45 and attached parts I term the typewriter carriage. As this carriage 50 of the adding machine forms no part of my invention except in so far as it co-operates with the typewriting mechanism, the same will not be described in detail.

51 is a finger piece, by means of which the adding machine carriage 50 may be released to move the same laterally of the adding machine 41.

Figure 4:
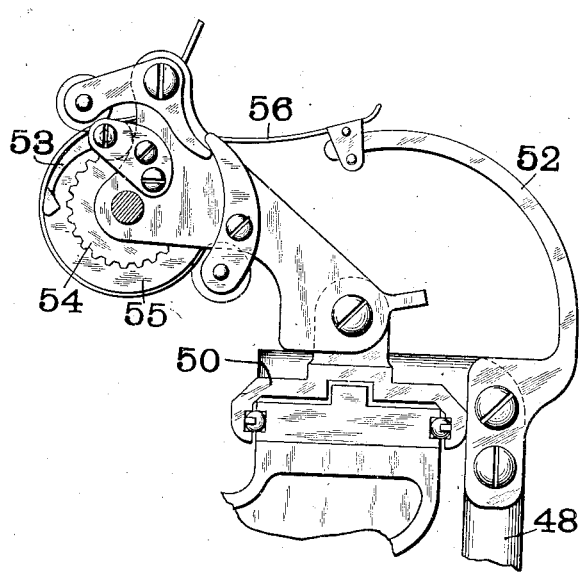
Figure 5:
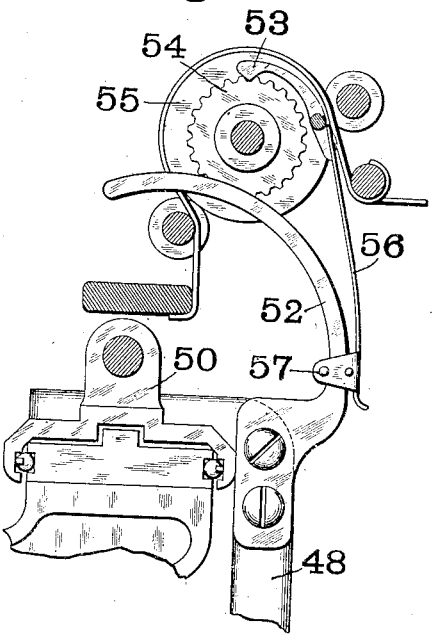
Figure 6:
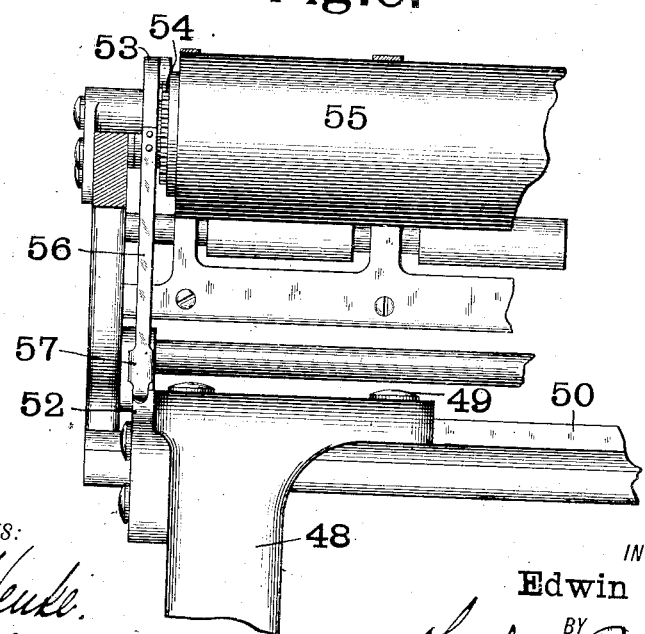

In order to provide means for controlling the line spacing, I secure to the right hand arm 48 a curved guide or cam 52, which arm or cam is adapted to control a centering pawl 53 engaging with a star wheel 54 rigidly secured to the paper roll or platen 55 of the adding machine carriage 50. It will be understood that the paper roll 55 is adapted to be swung from the position shown in full lines in Fig. 2 to that shown in dotted lines, as fully set forth in my prior patent heretofore referred to, so that when the said roll is in the first position, it will co-operate with the adding mechanism 41, and when in its second position it will co-operate with the typewriting mechanism. The centering pawl 53, when the roll 55 is in position to co-operate with the adding machine, is held out of engagement with the wheel 54, as shown in Fig. 4, by means of a spring 56 secured to the rear end of said pawl and provided with a clip 57 embracing the curved arm or cam 52. This arm or cam 52 is of such shape, however, that when the paper roll is thrown into its second position, as shown in Fig. 5, the spring 56 will be caused to hold the centering pawl 53 in engagement with the star wheel 54 on the roll 55, so that the roll cannot be rotated without the application of considerable force. The roll can be rotated, however, by means of the milled head 58 shown in Fig. 3, sufficient force being applied to overcome the pressure of the spring 56.

The frame 45, in addition to the cross rod 46, hereinbefore referred to, also carries a feed rack 60 (Fig. 1) supported on short rearwardly extending arms 61 and a bearing bar 62 carried on forwardly extending arms 63. The frame 45 also carries near its right hand end a rearwardly extending post 64, (see also Figs. 10 and 19) which supports the tension mechanism for letter spacing, and also a post 65 to which is pivoted a pawl 66 co-operating with a ratchet wheel 67 mounted on the post 64 and forming part of the tension mechanism. This ratchet wheel 67 has rigidly secured to it a spiral-shaped member 68, to which is attached one end of a strap 69, the opposite end of which is attached to the movable typewriter base, as will be hereinafter fully set forth. The spiral shape of the member 68 serves to equalize the pressure of the spring 70, one end of which is attached to the member 68 and the opposite end to the post 64.

The cross-rod 46 carried by the laterally movable frame or carriage 45 is surrounded by a hollow casting 72, shown in detail in Fig. 30. This casting 72 is provided with wheels 73 which bear upon the upper side of the rod 46, as also shown in Fig. 12. Projecting rearwardly from the casting 72 is an L-shaped arm 74, to which is secured the end of the strap 69 hereinbefore described. The casting 72, together with the attached parts having the same general movement, I term the typewriter base, and as will appear, these parts move in unison with the typewriter base 45, and also have independent lateral movement thereon. Pivoted on bushings 75 in the ends of the casting 72 are a pair of plates 76. These plates 76 of course move laterally of the machine, together with the casting 72, for securing letter spacing. They also form, together with a connecting cross-bar 77, a frame work which carries the letter spacing and ribbon feed mechanism, except such portion of said mechanisms as is carried by the frame 45 and the hollow casting 72, above described. The plates 76 and attached parts I term the typewriter main frame, or simply the typewriter frame. The type-writing mechanism proper is carried by plates 78 slidingly connected on the inner sides of the plates 76. The plate 78 and attached parts I term the typewriter auxiliary frame. The casting 72 is provided with a downwardly and forwardly projecting arm 79 having at its forward end a roller 80 bearing on the upper edge of the cross-bar 62, and a bearing block 81 (Fig. 25) bearing on the lower edge of said cross-bar. The casting 72 is thus prevented from rotating on the rod 46, but moves laterally on the rollers 73 bearing on the said rod 46 and the roller 80 bearing on the cross-bar 62. The arm 79 is also provided near its forward end with a bearing surface 82 upon which rests the cross-piece 77 when the typewriting mechanism is in its normal position. In order to provide a stop for the typewriting mechanism when it is swung into the position shown in Fig. 10, I form on each of the side plates 76 a rearward projection 84, best shown in Fig. 9, which is adapted to strike the rack bar 60 and thus limit the movement of the parts around the shaft 46.

Referring now more particularly to Figs. 9, 10 and 12, the sliding connection between the side plates 78 and the plates 76 is obtained as follows: Journaled in upward extensions of the plates 76 is a shaft 85 which passes through slots 86 in the side plates 78. This shaft 85 is provided with downward extensions 87 (see also Fig. 11) provided at their lower ends with pins 88 passing through slots 89 in the plates 76. The plates 78 are also provided with screws 90 passing through slots 91 (see Figs. 10 and 12) in the plates 76. Pivoted on the rock shaft 85 at the inner side of the left hand plate 78 is a key lever 92 carrying the shift key 93. This lever has a downward projection 94 surrounding the pin 88 of the left hand arm 87, so that when the shift key 93 is depressed, the plates 78 will be moved toward the rear of the machine. As the plates 78 carry all of the key bar and type bar mechanism, it will be evident that the said mechanism will be shifted in the usual manner to change from lower to upper case letters. The rear and upper edges of the side plates 78 are connected by cross plates 96 and 97, to the rear of which is secured a knife edge 98 acting as a fulcrum for the key bars 99. The key bars 99 are provided with the usual keys 100. 101 are springs attached at one end to the key bars 99 and at the other to the plate 96. Connecting the side plates 78 is a cross piece 102, to which is secured a segmental part 103 for carrying the type bars. The part 103 is L-shaped in cross-section, as shown in detail in Figs. 15, 16 and 18. The part 103 is provided with a cover-plate 104, between which and the part 103 are secured the U-shaped type bar hangers 105, by means of screws 106. Between the ends of each of the U-shaped type bar hangers 105 is pivoted a type lever 107. At 108 each of the type levers 107 is provided with a double type head 109, so that each type bar prints two characters by the shifting of the type mechanism in the manner hereinbefore described. Each of the type levers 107 is connected to its corresponding key lever 99 by a rod 110, the lower end of which is pivoted to the type bar at 111, and the upper end of which is pivoted to the key bar by a stud 112 passing through an opening in the said key bar, as shown in detail in Fig. 17. The stud 112 is retained in position in the opening of the key bar 99 by means of a spring 113 riveted to the lower end of a turn-buckle 114 carrying the said pin 112 and bent up against the side of the key bar, as shown in Fig. 17. The turn-buckle 114 receives the threaded upper end of the rod 110 and serves to adjust the length of said rod. A lock nut 115 prevents movement between the turn-buckle 114 and the rod 110 after the proper adjustment is secured. The type bars 107 when in their normal position rest against a curved support 116 carried by the side plates 78. It will be evident from Fig. 18 that the connection between the rods 110 and the type bars 107 is such that the said rods 110 act upon the bars at an angle of about 45°, both in starting the movement to strike the type and in returning the type bars to normal position, so that in both cases a favorable position is insured.

In order to feed the casting 72 and attached parts for letter spacing, I provide the said casting 72 with a pair of downwardly and forwardly projecting lugs 120, between which is pivoted a short rock shaft 121, shown in detail in Figs. 26 and 30. The pivotal connection between the lugs 120 and the rock shaft 122 is obtained by means of adjustable pivot points 121 held in position by screws 123, as shown in detail in Fig. 23. Projecting rearwardly from the rock shaft 121 is an arm 124 carrying a fixed feed dog 125 and a pivoted feed dog 126 controlled by a spring 127, said feed dogs 125 and 126 being adapted to alternately engage with the feed rack 60. The arm 124 is held in normal position, so that the pivoted dog 126 will engage with the rack by means of a spring 128 (Fig. 25), secured at one end to a pin 129 on a short forward projection 130 on the rock shaft 121, and at the other to a pin 131 in the arm 79 hereinbefore described. The projection 130 is also provided with a set screw 132 adapted to bear against the lower edge of the said arm 79 and thus limit the upward movement of the projection 30. It will be evident that each time the rock shaft 121 is operated the casting 72 and attached parts will be fed one step toward the right. The rock shaft 121 is also provided with rearward extensions 134 carrying laterally projecting arms 135. Bearing on the upper edges of the arms 135 near their outer ends are inverted U-shaped members 136 carried by rods 137 pivoted to a universal bar 138 passing beneath all the key bars 99 and also beneath the space bar levers 139 carrying the usual space bar 140. The universal bar 138 is carried by levers 141 pivoted to the plates 78 and 142. The lower ends of the rods 137 work in guides 143 carried by the bar 102 hereinbefore described. It is evident that as the rods 137 are supported by parts carried on the movable plates 78, the said rods will move toward and from the rear of the machine when the shift key 93 is operated. The shape of the members 136 allow this to be accomplished without losing connection with the arms 135, as will be best seen by reference to Fig. 12. The U-shaped members 136 are each provided with a pin 144 bearing on an arm 145 rigidly secured to a rock shaft 146, which rock shaft is secured in brackets 147 on the rear face of the cross-bar 77. The rock shaft 146 is provided with a pair of curved arms 148, the forward ends of which engage the under side of rearward projections on ribbon carriers 149 pivoted to brackets 150 on the front face of the cross-bar 77. The ribbon carriers 149 are normally held in the position shown in Fig. 9 by means of coil springs 151 secured at one end to the rearward extensions of said carriers and at the other to a pin 152 in the brackets 150. It will be evident, however, that when the rods 135 are depressed by the movement of the key bars 99, the ribbon carriers 149 will be thrown into the position shown in Fig. 12, so as to move the ribbon, which will be hereinafter described, into proper position between the type heads and the paper roller. The right hand arm 135 is provided with a finger-piece 155, by means of which the rock shaft 121 can be rocked to a greater extent than in the ordinary operation of the machine, so as to release both the dog 125 and the dog 126 from the feed rack 60, so that the casting 72 and attached parts forming the typewriter base can be freely moved along the rod 46. The finger piece 155 may be in the form shown in Fig. 8 in which the arm is bent forward, or it may be in the form shown in Fig. 30 in which the arm 135 is not bent, the form of the finger piece being of no importance. In order to limit this movement of the rock shaft 121, the casting 72 is provided on its rear face with a bracket 156 containing a set screw 157 against which the arm 124 is adapted to strike.

160 are the ribbon spools, each of which is secured to a shaft 161 carried on brackets 162 on the side plates 76. Secured to the rear end of each of the shafts 161 is a beveled gear 163. Slidingly journaled in the plates 76 is a shaft 164 provided with two beveled gears 165, each adapted to mesh with one of the beveled gears 163. The shaft 164 is provided with two circumferential grooves 166. A cross-bar 167 extending between the plates 76 is provided with a spring detent 168 adapted to engage with one or the other of the grooves 166, as best shown in Fig. 8. When the detent 168 engages with one of the right hand grooves 166, the wheel 165 at the right hand end of the shaft 164 will engage with the gear 163 of the right hand spool 160, while when the detent 168 is in the other of the grooves 166, the wheel 165 at the left hand end of the shaft 164 will engage with the wheel 163 of the left hand spool 160, thus providing reversing means for the inking ribbon. In order to provide for winding the ribbon by hand the shaft 164 is provided with a crank arm 169. The shaft 164 passes through two of the arms of a triple bracket 170, between which is a sleeve 171 surrounding the said shaft 164 and adapted to slide on the said shaft, but incapable of independent rotation. This is obtained as shown in detail in Figs. 21 and 22, by providing the said shaft 164 with a slot 172 and providing the sleeve 171 with a set screw 173 projecting into the slot 172. The sleeve 171 is provided with a beveled gear 174, which meshes with a beveled gear 175 carried on a shaft 176 passing through a rearwardly and downwardly extending portion of the bracket 170 and through a bracket 177 carried on the under side of said first named bracket 170. The shaft 176 is provided on its end with a beveled gear wheel 178, which normally meshes with a small beveled gear 179 carried on a shaft 180 journaled in a projection on the rear face of the casting 72. When the typewriting mechanism is swung on the shaft 46, however, the wheel 178 will swing away from the wheel 179, as indicated by the dotted lines in Fig. 12. The lower end of the shaft 180 has loosely mounted on it a toothed wheel 181 meshing with the feed rack 60. This wheel 181 has rigidly secured to it a ratchet wheel 182. Surrounding the lower end of the shaft 180 and rigidly secured thereto is a cup-shaped member 183 provided with a pawl 184 engaging with the ratchet wheel 182. The pawl is held in position by means of a spring 185. It is evident from this construction that when the casting 72 and attached parts are moved in one direction, the rotation of the wheel 181 will be communicated to the shaft 180, while if said parts are moved in the opposite direction the motion will not be communicated, as the dog 184 will simply slip over the teeth of the ratchet wheel 182. Owing to this the ribbon 186, which is wound upon the spools 160, will be fed forward when the typewriting mechanism is moved toward the right hand of the machine, but when returned toward the left the said ribbon will not be fed. In order to prevent injury to the parts in case a tooth on the wheel 178 should strike against a tooth of the wheel 179 when the two are swung into mesh, I may provide for play between the said wheels as shown in Fig. 12$^a$, and surround the shaft 176 between the brackets 170 and 177 with a coil spring 187, one end of which bears against the bracket 170 and the other against a collar 188 rigidly secured to the shaft 176. The wheels 178 and 179 are thus held in mesh only by the pressure of the spring 187, and, consequently, no injury can occur to the machine through the failure of the said wheels to properly mesh when the typewriting mechanism is swung into normal position.

In order to hold the rock shaft 85 in normal position, I provide two springs 190 (Fig. 8), one end of each of which is attached to a pin 191 in the downward extension 87 of the said rock shaft 85, and the other end to a bracket 192 carried on the cross bar 167. The lower end of the extensions 87 will thus be held in their forward position so as to move the plates 87 to their forward position, and, consequently, in the normal position of the parts the inner type on the type heads 109 will be in position to strike the printing point on the paper roll 55. In order to hold the universal bar 138 in its normal raised position, I provide the said part with a pair of brackets 193 (Figs 11 and 12), to the upper end of each of which is secured one end of a coil spring 194, the opposite end of which is secured to a pin 195 in one of the side frames 78.

In order that the machine may be used with the ordinary strip of narrow paper wound upon a roll in place of wide or sheet paper, the platen mechanism 50 is provided with downwardly extending arms 196, carrying the paper roll 197, as is best seen in Figs. 2 and 10. It will be seen that the shape of the arms 48 is such as to allow ready access to the paper roll 197 when the typewriting mechanism is thrown back, as shown in Fig. 10.

The operation of my machine is as follows: The normal position of the various parts of the machine is shown in top plan view in Fig. 1 and in vertical section in Fig. 9. When the parts are in this position, the carriage 50 of the adding machine 41 may be released by means of the finger piece 51, so that the said carriage may be moved laterally of the adding machine to bring any desired part of the roll 55 in position to be operated on by the printing mechanism of the adding machine. Inasmuch as the carriage 50 of the adding machine is rigidly secured by the screws 49 to the U-shaped arms 48, the entire typewriting mechanism will be moved along the guide rod 44 of the main frame 40 in unison with the said adding machine carriage. When the parts are thus brought into the desired lateral position, they are locked in place by releasing the finger piece 51. If it is now desired to cause the typewriting mechanism to print on the paper roll 55, it is swung from the position shown in full lines in Fig. 10 to that shown in dotted lines. By swinging the plates 76 and the attached parts, forming the typewriter frame, into the position shown in Fig. 10, the printing upon the roll 55 will be visible. The parts may now be swung in their normal position and the typewriting mechanism positioned relatively to the paper roll 55 by depressing the finger piece 155, so as to release both dogs 125 and 126 of the letter spacing mechanism from the rack 60. As soon as the desired position is reached the typewriting mechanism is actuated by means of the keys 100. When one of the keys 100 is depressed the corresponding key bar 99 is moved with the knife edge 98 as a fulcrum. The movement of the key bar 99 is communicated through the connecting rod 110 to the corresponding type bar 107 so that the said type bar is swung on its pivot 108 so as to bring one of the type on the type head 109 into contact with the printing point of the paper roll 55. If the shift key 97 is in its normal position the inner type of the head 109 will be brought into contact with the printing point on the roll 55. If, however, the shift key 97 is depressed, as shown in Fig. 12 of the drawings, the rock shaft 85 will be actuated and the plates 79, with all the attached parts, forming the auxiliary typewriter frame, moved toward the rear, so that the outer type on the head 109 will be brought into contact with the printing point on the roll 55. Prior to the contact of the type with the roll, the universal bar 138 will be moved downward against the tension of the spring 194 by reason of the contact of the key bar 99 with the said universal bar 138. The movement of the universal bar 138 will be communicated through the connecting rods 137 and the inverted U-shaped pieces 136 to the cross bar 135. At the same time the pins 144 on the parts 136 will come into contact with the arms 145 and rock the shaft 146 so that the forward ends of the curved members 148 carried by the said rock shaft 146 will actuate the ribbon carriage 149, so as to move the ribbon 180 into position between the type heads 109 and the roll 55, as shown in Fig. 12. The ribbon carriers 149 are normally in the position shown in Fig. 9, and are held in this position, except when actuated as above described, by means of the springs 151, thus leaving the upper portion of the roll 55 uncovered, so that the printing may be observed by swinging back the type-writing mechanism on the rod 46. The movement of the cross bar 135, as above described, by the depression of the key bar 99, rocks the shaft 121 on its pivots 122, and thus disengages the pivoted dog 126 from the teeth of the rack 60. Before the pivoted dog 126 leaves contact with the teeth of the rack, however, the fixed dog 125 comes into engagement with the said teeth so that there is no movement of the printing mechanism along the rack during the downward movement of the arms 135. As soon as the movable dog 126 is out of engagement with the teeth, it will be moved forward by the spring 127, as shown in Fig. 9, so as to be in position to engage with the next tooth of the rack. Upon the return movement of the arms 135 the rock shaft 121 will resume its normal position so as to bring the pivoted dog 126 into engagement with the next tooth of the rack 60. As soon as this occurs the tension of the spring 70 acting through the strap 69 will pull the entire typewriting mechanism toward the right until the movable dog 126 is brought into its normal position, as shown in Fig. 26, so that the printing mechanism is moved toward the right the distance of about one letter space. The depression of the finger piece 155 moves the rock shaft 121 until its arm 124 comes in contact with the stop screw 157, so that both the dogs 125 and 126 are moved out of engagement with the teeth of the rack 60 and the entire mechanism may be moved along the shaft 46. Whenever the printing mechanism is moved toward the right the movement of the ratchet wheel 181 will be communicated through the ratchet wheel 182 and dog 184 to the cup 183 rigidly secured to the upright shaft 180, and, consequently, if the parts are in their normal position, the movement will be transmitted through the wheels 179 and 178 to the shaft 164, so as to feed the inking ribbon 180. Upon the movement of the parts to the left, however, the ratchet mechanism will prevent the feeding of the ribbon and when the typewriting mechanism is swung back, as shown in Fig. 10, so as to be out of printing position, the wheel 178 will be thrown out of mesh with the wheel 179, so that the movement of the parts in either direction will have no effect upon the ribbon mechanism.

Having fully described my invention, what I claim as new and desire to secure by Letters Patent of the United States, is—

1. The combination with an adding machine provided with a carriage, of a platen for said carriage, typewriting mechanism comprising key bars and type bars, connection between said typewriting mechanism and adding machine carriage, whereby said parts may be moved in unison, means for moving said typewriting mechanism laterally independently of said adding machine carriage, and means for pivotally moving said platen into one position to co-operate with said adding machine and into another to co-operate with said typewriting mechanism.

2. The combination with an adding machine provided with a carriage, of a platen for said carriage, typewriting and actuating mechanism, connections between said typewriting and actuating mechanism and said adding machine carriage, whereby said parts may be moved in unison, means for independently moving said typewriting and actuating mechanism laterally along said carriage, and means for moving said typewriting mechanism transversely to said carriage.

3. The combination with an adding machine provided with a carriage, of a platen for said carriage, typewriting mechanism, connections between said typewriting mechanism and said adding machine carriage, whereby said parts may be moved in unison, means for independently moving said typewriting mechanism laterally along said carriage, and means for pivotally moving said typewriting mechanism transversely to said carriage.

4. The combination with an adding machine provided with a carriage, of a platen for said carriage, typewriting mechanism comprising key bars and type bars, means for moving said typewriting mechanism laterally along said carriage, and means for moving said typewriting mechanism transversely to said carriage.

5. The combination with an adding machine provided with a carriage, of a platen for said carriage, typewriting mechanism comprising key bars and type bars, means for moving said typewriting mechanism laterally along said carriage, and means for pivotally moving said typewriting mechanism transversely to said carriage.

6. The combination with an adding machine provided with a carriage, of a platen for said carriage, typewriting mechanism comprising key bars and type bars, connections between said typewriting mechanism and said adding machine carriage, whereby said parts may be moved in unison, means for independently moving said typewriting mechanism laterally along said carriage, and means for moving said typewriting mechanism transversely to said carriage.

7. The combination with an adding machine provided with a carriage, of a platen for said carriage, typewriting mechanism comprising key bars and type bars, connections between said typewriting mechanism and said adding machine carriage, whereby said parts may be moved in unison, means for independently moving said typewriting mechanism laterally along said carriage, and means for pivotally moving said typewriting mechanism transversely to said carriage.

8. The combination with an adding machine provided with a carriage, of a platen for said carriage, typewriting mechanism comprising key bars and type bars, means for moving said typewriting mechanism laterally along said carriage, means for pivotally moving said typewriting mechanism transversely to said carriage, and means for slidingly moving a portion of said typewriting mechanism transversely to said carriage independently of the remaining portion.

9. The combination with an adding machine provided with a carriage, of a platen for said carriage, typewriting mechanism comprising key bars and type bars, connections between said typewriting mechanism and adding machine carriage, whereby said parts may be moved in unison, means for moving said typewriting mechanism laterally along said carriage, means for pivotally moving said typewriting mechanism transversely to said carriage, and means for slidingly moving a portion of said typewriting mechanism transversely to said carriage independently of the remaining portion.

10. The combination with an adding machine, of a carriage for said adding machine, typewriting mechanism connected with said carriage to move in unison therewith, means for independently moving said typewriting mechanism laterally along said carriage, and means for moving said typewriting mechanism upwardly and rearwardly away from said carriage.

11. The combination with an adding machine, of a carriage for said adding machine, typewriting mechanism connected with said carriage to move in unison therewith, means for independently moving said typewriting mechanism laterally along said carriage, and pivotal means for moving said typewriting mechanism upwardly and rearwardly away from said carriage 12. The combination with an adding machine, of a carriage for said adding machine, typewriting mechanism connected with said carriage to move in unison therewith, means for independently moving said typewriting mechanism laterally along said carriage, pivotal means for moving said typewriting mechanism upwardly and rearwardly away from said carriage, and means for slidingly moving a portion of said typewriting mechanism rearwardly independently of the remaining portion.

13. The combination with an adding machine provided with a carriage, of typewriting mechanism comprising type bars and key bars, connections between said carriage and typewriting mechanism, whereby said parts may be moved in unison, means for moving said typewriting mechanism laterally along said carriage, and means for moving said typewriting mechanism upwardly and rearwardly away from said carriage.

14. The combination with an adding machine provided with a carriage, of typewriting mechanism comprising type bars and key bars, connections between said carriage and typewriting mechanism, whereby said parts may be moved in unison, means for moving said typewriting mechanism laterally along said carriage, and pivotal means for moving said typewriting mechanism upwardly and rearwardly away from said carriage.

15. The combination with an adding machine provided with a carriage, of typewriting mechanism comprising key bars and type bars, connections between said carriage and typewriting mechanism, whereby said parts may be moved in unison, means for moving said typewriting mechanism laterally along said carriage, pivotal means for moving said typewriting mechanism upwardly and rearwardly away from said carriage, and means for slidingly moving a portion of said typewriting mechanism rearward independently of the remaining portion.

16. The combination with a base, of an adding machine secured to said base, a support carried by said base at the rear of the adding machine a typewriting mechanism carried by said support and movable thereon, and means for securing said typewriting mechanism in different positions relative to said adding machine.

17. The combination with a base, of an adding machine secured to said base, a support carried by said base at the rear of the adding machine, typewriting mechanism carried by said support and movable laterally thereof, and a platen adapted to co-operate with said adding machine and with said typewriting mechanism.

18. The combination with a base, of an adding machine carried by said base and provided with a carriage, a support carried by said base at the rear of the adding machine, and typewriting mechanism movably mounted on said support and connected with said adding machine carriage.

19. The combination with a base, of an adding machine secured to said base and provided with a carriage, a support carried by said base at the rear of the adding machine, a typewriter carriage carried by said support and connected with said adding machine carriage to move thereon, and typewriting mechanism carried by said typewriter carriage.

20. The combination with a base, of an adding machine secured to said base and provided with a carriage, a support carried by said base at the rear of the adding machine, a typewriter carriage carried by said support and connected with said adding machine carriage to move thereon, and typewriting mechanism movably carried by said typewriter carriage.

21. The combination with a base, of an adding machine secured to said base and provided with a carriage, a support carried by said base at the rear of the adding machine, a typewriter carriage carried by said support and connected with said adding machine carriage, and typewriting mechanism carried by said base and movable laterally thereof.

22. The combination with a base, of an adding machine carried by said base, a carriage for said adding machine, a typewriter carriage carried by said base and connected with said adding machine carriage, and a typewriting mechanism carried by said typewriter carriage and laterally movable thereon, said typewriting mechanism being also pivotally movable upwardly and rearwardly.

23. The combination with a base, of an adding machine secured to said base, a support carried by said base at the rear of the adding machine, a typewriting mechanism comprising key bars and type bars and movably mounted on said support, and means for securing said typewriting mechanism in different positions relative to said adding machine.

24. The combination with a base, of an adding machine carried by said base, a support carried by said base at the rear of the adding machine, typewriting mechanism comprising key bars and type bars, and movably mounted on said support, and a platen adapted to co-operate with said adding machine and with said typewriting mechanism.

25. The combination with a base, of an adding machine secured to said base, a carriage for said adding machine, a typewriter carriage carried by said base and connected with said adding machine carriage, and a typewriting mechanism carried by said typewriter carriage and comprising type bars and key bars, said typewriting mechanism being movable laterally of said typewriter carriage and also pivotally movable upwardly and rearwardly.

26. The combination with a main base, of an adding machine carried by said base, a carriage for said adding machine, a typewriter carriage carried by said main base and connected with said adding machine carriage, a typewriter base longitudinally movable on said typewriter carriage, and typewriting mechanism mounted on said typewriter base.

27. The combination with a main base, of an adding machine carried by said base, a carriage for said adding machine, a typewriter carriage carried by said main base and connected with said adding machine carriage, a typewriter base longitudinally movable on said typewriter carriage, and typewriting mechanism movably mounted on said typewriter base.

28. The combination with a main base, of an adding machine carried by said base, a carriage for said adding machine, a typewriter carriage carried by said main base and connected with said adding machine carriage, a typewriter base longitudinally movable on said typewriter carriage, and typewriting mechanism pivotally mounted on said typewriter base.

29. The combination with a main base, of an adding machine carried by said base, a carriage for said adding machine, a typewriter carriage carried by said main base and connected with said adding machine carriage, a typewriter base longitudinally movable on said typewriter carriage, and typewriting mechanism comprising type bars and key bars and mounted on said typewriter base.

30. The combination with a main base, of an adding machine carried by said base, a carriage for said adding machine, a typewriter carriage carried by said main base and connected with said adding machine carriage, a typewriter base longitudinally movable on said typewriter carriage, and typewriting mechanism comprising type bars and key bars and movably mounted on said typewriter base.

31. The combination with a main base, of an adding machine carried by said base, a carriage for said adding machine, a typewriter carriage carried by said main base and connected with said adding machine carriage, a typewriter base movably carried by said typewriter carriage, and typewriting mechanism comprising type bars and key bars and pivotally mounted on said typewriter base.

32. The combination with a main base, of an adding machine carried by said base, a carriage for said adding machine, a typewriter carriage carried by said main base, a typewriter base carried by said typewriter carriage, typewriting mechanism movably mounted on said typewriter base, and a platen pivoted to said adding machine carriage and co-operating with said adding machine and said typewriting machine.

33. The combination with a main base, of an adding machine carried by said base, a carriage for said adding machine, a typewriter carriage carried by said main base, a typewriter base carried by said typewriter carriage, typewriting mechanism pivotally mounted on said typewriter base, and a platen pivoted to said adding machine carriage and co-operating with said adding machine and said typewriting machine.

34. The combination with a main base, of an adding machine carried by said base, a carriage for said adding machine, a typewriter carriage carried by said main base, a typewriter base longitudinally movable on said typewriter carriage, typewriting mechanism comprising key bars and type bars and mounted on said typewriter base, and a platen pivoted to said adding machine carriage and co-operating with said adding machine and typewriting mechanism.

35. The combination with a main base, of an adding machine carried by said base, a carriage for said adding machine, a typewriter carriage carried by said main base, a typewriter base longitudinally movable on said typewriter carriage, typewriting mechanism comprising key bars and type bars and movably mounted on said typewriter base, and a platen pivoted to said adding machine carriage and co-operating with said adding machine and typewriting mechanism.

36. The combination with a main base, of an adding machine carried by said base, a carriage for said adding machine, a typewriter carriage carried by said main base, a typewriter base movably carried by said typewriter carriage, typewriting mechanism comprising key bars and type bars and pivotally mounted on said typewriter base, and a platen pivoted to said adding machine carriage and co-operating with said adding machine and typewriting mechanism.

37. The combination with a main base, of an adding machine carried by said base, a carriage for said adding machine, a typewriter carriage carried by said main base and connected with said adding machine carriage, a typewriter base longitudinally movable on said typewriter carriage, typewriting mechanism mounted on said typewriter base, and a platen pivoted to said adding machine carriage and co-operating with said adding machine and said typewriting mechanism.

38. The combination with a main base, of an adding machine carried by said base, a carriage for said adding machine, a typewriter carriage carried by said main base and connected with said adding machine carriage, a typewriter base longitudinally movable on said typewriter carriage, typewriting mechanism movably mounted on said typewriter base, and a platen pivoted to said adding machine carriage and co-operating with said adding machine and said typewriting mechanism.

39. The combination with a main base, of an adding machine carried by said base, a carriage for said adding machine, a typewriter carriage carried by said main base and connected with said adding machine carriage, a typewriter base movably carried by said typewriter carriage, typewriting mechanism pivotally mounted on said typewriter base, and a platen pivoted to said adding machine carriage and co-operating with said adding machine and said typewriting mechanism.

40. The combination with a main base, of an adding machine carried by said base, a carriage for said adding machine, a typewriter carriage carried by said main base and connected with said adding machine carriage, a typewriter base longitudinally movable on said typewriter carriage, typewriting mechanism comprising type bars and key bars and mounted on said typewriter base, and a platen pivoted to said adding machine carriage and co-operating with said adding machine and said typewriting mechanism.

41. The combination with a main base, of an adding machine carried by said base, a carriage for said adding machine, a typewriter carriage carried by said main base and connected with said adding machine carriage, a typewriter base longitudinally movable on said typewriter carriage, typewriting mechanism comprising type bars and key bars and movably mounted on said typewriter base, and a platen pivoted to said adding machine carriage and co-operating with said adding machine and said typewriting mechanism.

42. The combination with a main base, of an adding machine carried by said base, a carriage for said adding machine, a typewriter carriage carried by said main base and connected with said adding machine carriage, a typewriter base movably carried by said typewriter carriage, typewriting mechanism comprising type bars and key bars and pivotally mounted on said typewriter base, and a platen pivoted to said adding machine carriage and co-operating with said adding machine and said typewriting mechanism.

43. The combination with a main base, of an adding machine carried by said base, a typewriter base movably carried on said main base, a typewriter main frame longitudinally movable on said typewriter base, a typewriter auxiliary frame movably carried by said typewriter main frame and provided with impression devices, and a platen co-operating with said adding machine and impression devices.

44. The combination with a main base, of an adding machine carried by said base, a typewriter base movably carried on said main base, a typewriter main frame longitudinally movable on said typewriter base, a typewriter auxiliary frame movably carried by said typewriter main frame and provided with impression devices, and a platen co-operating with said adding machine and impression devices.

45. The combination with a main base, of an adding machine carried by said base, a typewriter base movably carried on said main base, a typewriter main frame pivotally carried by said typewriter base, a typewriter auxiliary frame movably carried by said typewriter main frame and provided with impression devices, and a platen co-operating with said adding machine and impression devices.

46. The combination with a main base, of an adding machine carried by said base, a typewriter base movably carried on said main base, a typewriter main frame mounted on said typewriter base, a typewriter auxiliary frame movably carried by said typewriter main frame, type bars carried by said auxiliary frame, and a platen co-operating with said adding machine and said type bars.

47. The combination with a main base, of an adding machine carried by said base, a typewriter base movably carried on said main base, a typewriter main frame movably mounted on said typewriter base, a typewriter auxiliary frame movably carried by said typewriter main frame, type bars carried by said auxiliary frame, and a platen co-operating with said adding machine and said type bars.

48. The combination with a main base, of an adding machine carried by said base, a typewriter base movably carried on said main base, a typewriter main frame pivotally mounted on said typewriter base, a typewriter auxiliary frame movably carried by said typewriter main frame, type bars carried by said auxiliary frame, and a platen co-operating with said adding machine and said type bars.

49. The combination with a main base, of an adding machine carried by said base, a typewriter carriage movably mounted on said main base, a typewriter base movably mounted on said typewriter carriage, a typewriter main frame mounted on said typewriter base, a typewriter auxiliary frame movably carried by said typewriter main frame and provided with impression devices, and a platen co-operating with said adding machine and said impression devices.

50. The combination with a main base, of an adding machine carried by said base, a typewriter carriage movably mounted on said main base, a typewriter base movably mounted on said typewriter carriage, a typewriter main frame movably mounted on said typewriter base, a typewriter auxiliary frame movably carried by said typewriter main frame and provided with impression devices, and a platen co-operating with said adding machine and said impression devices.

51. The combination with a main base, of an adding machine carried by said base, a typewriter carriage movably mounted on said main base, a typewriter base movably mounted on said typewriter carriage, a typewriter main frame pivotally mounted on said typewriter base, a typewriter auxiliary frame movably carried by said typewriter main frame and provided with impression devices, and a platen co-operating with said adding machine and said impression devices.

52. The combination with a main base, of an adding machine carried by said base, a typewriter carriage movably mounted on said main base, a typewriter base movably mounted on said typewriter carriage, a typewriter main frame mounted on said typewriter base, a typewriter auxiliary frame movably carried by said typewriter main frame, type bars carried by said auxiliary frame, and a platen co-operating with said adding machine and said type bars.

53. The combination with a main base, of an adding machine carried by said base, a typewriter carriage movably mounted on said main base, a typewriter base movably mounted on said typewriter carriage, a typewriter main frame movably mounted on said typewriter base, a typewriter auxiliary frame movably carried by said typewriter main frame, type bars carried by said auxiliary frame, and a platen co-operating with said adding machine and said type bars.

54. The combination with a main base, of an adding machine carried by said base, a typewriter carriage movably mounted on said main base, a typewriter base movably mounted on said typewriter carriage, a typewriter main frame pivotally mounted on said typewriter base, a typewriter auxiliary frame movably carried by said typewriter main frame, type bars carried by said auxiliary frame, and a platen co-operating with said adding machine and said type bars.

55. The combination with a main base, of an adding machine carried by said base, a carriage for said adding machine, a typewriter carriage movably mounted on said main base and connected with said adding machine carriage, a typewriter base longitudinally movable on said typewriter carriage, a typewriter main frame mounted on said typewriter base, a typewriter auxiliary frame movably carried by said typewriter main frame and provided with impression devices, and a platen co-operating with said adding machine and impression devices.

56. The combination with a main base, of an adding machine carried by said base, a carriage for said adding machine, a typewriter carriage movably mounted on said main base and connected with said adding machine carriage, a typewriter base longitudinally movable on said typewriter carriage, a typewriter main frame movably mounted on said typewriter base, a typewriter auxiliary frame movably carried by said typewriter main frame and provided with impression devices, and a platen co-operating with said adding machine and impression devices.

57. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame pivotally mounted on said typewriter base, a typewriter auxiliary frame movably carried by said typewriter main frame and provided with impression devices, and a platen co-operating with said adding machine and impression devices.

58. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame mounted on said typewriter base, a typewriter auxiliary frame movably mounted on said typewriter main frame, type bars carried by said auxiliary frame, and a platen co-operating with said adding machine and said type bars.

59. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame movably mounted on said typewriter base, a typewriter auxiliary frame movably mounted on said typewriter main frame, type bars carried by said auxiliary frame, and a platen co-operating with said adding machine and said type bars.

60. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame pivotally mounted on said typewriter base, a typewriter auxiliary frame movably mounted on said typewriter main frame, type bars carried by said auxiliary frame, and a platen co-operating with said adding machine and said type bars.

61. The combination with a main base, of an adding machine carried by said base, a carriage for said adding machine, a typewriter carriage movably mounted on said main base and connected with said adding machine carriage, a typewriter base longitudinally movable on said typewriter carriage, a typewriter main frame mounted on said typewriter base, a typewriter auxiliary frame movably carried by said typewriter main frame and provided with impression devices, and a platen pivotally mounted on said adding machine carriage and co-operating with said adding machine and said impression devices.

62. The combination with a main base, of an adding machine carried by said base, a carriage for said adding machine, a typewriter carriage movably mounted on said main base and connected with said adding machine carriage, a typewriter base longitudinally movable on said typewriter carriage, a typewriter main frame movably mounted on said typewriter base, a typewriter auxiliary frame movably carried by said typewriter main frame and provided with impression devices, and a platen pivotally mounted on said adding machine carriage and co-operating with said adding machine and said impression devices.

63. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame pivotally mounted on said typewriter base, a typewriter auxiliary frame movably carried by said typewriter main frame and provided with impression devices, and a platen pivotally mounted on said adding machine carriage and co-operating with said adding machine and said impression devices.

64. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame mounted on said typewriter base, a typewriter auxiliary frame movably carried by said typewriter main frame, type bars carried by said auxiliary frame, and a platen pivotally mounted on said adding machine carriage and co-operating with said adding machine and said type bars.

65. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame movably mounted on said typewriter base, a typewriter auxiliary frame movably carried by said typewriter main frame, type bars carried by said auxiliary frame, and a platen pivotally mounted on said adding machine carriage and co-operating with said adding machine and said type bars.

66. The combination with a main base, of an adding machine carried by said base, a carriage for said adding machine, a typewriter carriage movably mounted on said main base and connected with said adding machine carriage, a typewriter base movably mounted on said typewriter carriage, a typewriter main frame pivotally mounted on said typewriter base, a typewriter auxiliary frame movably carried by said typewriter main frame, type bars carried by said auxiliary frame, and a platen pivotally mounted on said adding machine carriage and co-operating with said adding machine and said type bars.

67. The combination with a main base, of an adding machine carried by said base, a typewriter base movable on said main base, a typewriter main frame carried by said typewriter base, ribbon feeding devices carried by said typewriter main frame, a typewriter auxiliary frame movably carried by said typewriter main frame and provided with impression devices, and a platen carried by said adding machine and co-operating with said adding machine and impression devices.

68. The combination with a main base, of an adding machine carried by said base, a typewriter base movable on said main base, a typewriter main frame movably carried by said typewriter base, ribbon feeding devices carried by said typewriter main frame, a typewriter auxiliary frame movably carried by said typewriter main frame and provided with impression devices, and a platen carried by said adding machine and co-operating with said adding machine and impression devices.

69. The combination with a main base, of an adding machine carried by said base, a typewriter base movable on said main base, a typewriter main frame pivotally carried by said typewriter base, ribbon feeding devices carried by said typewriter main frame, a typewriter auxiliary frame movably carried by said typewriter main frame and provided with impression devices, and a platen carried by said adding machine and co-operating with said adding machine and impression devices.

70. The combination with a main base, of an adding machine carried by said base, a typewriter base movable on said main base, a typewriter frame movably mounted on said typewriter base, ribbon feeding and impression devices carried by said typewriter frame, means governed by the movement of said typewriter frame on said typewriter base for throwing said ribbon feeding devices out of operation, and a platen carried by said adding machine and co-operating with said adding machine and impression devices.

71. The combination with a main base, of an adding machine carried by said base, a typewriter base movable on said main base, a typewriter frame pivotally mounted on said typewriter base, ribbon feeding and impression devices carried by said typewriter frame, means governed by the movement of said typewriter frame on said typewriter base for throwing said ribbon feeding devices out of operation, and a platen carried by said adding machine and co-operating with said adding machine and impression devices.

72. The combination with a main base, of an adding machine carried by said base, a typewriter base movable on said main base, a typewriter main frame movably carried by said typewriter base, ribbon feeding devices carried by said typewriter main frame, a typewriter auxiliary frame movably mounted on said typewriter main frame and provided with impression devices, means governed by the movement of said typewriter main frame on said typewriter base for throwing said ribbon feeding devices out of operation, and a platen carried by said adding machine and co-operating with said adding machine and said impression devices.

73. The combination with a main base, of an adding machine carried by said base, a typewriter base movable on said main base, a typewriter main frame pivotally carried by said typewriter base, ribbon feeding devices carried by said typewriter main frame, a typewriter auxiliary frame movably mounted on said typewriter main frame and provided with impression devices, means governed by the movement of said typewriter main frame on said typewriter base for throwing said ribbon feeding devices out of operation, and a platen carried by said adding machine and co-operating with said adding machine and said impression devices.

74. The combination with a main base, of an adding machine carried by said base, a typewriter base movable on said main base, a typewriter main frame pivotally mounted on said typewriter base, spacing mechanism carried by said typewriter main frame, a typewriter auxiliary frame movably mounted on said typewriter main frame and provided with impression devices, and a platen carried by said adding machine and co-operating with said adding machine and impression devices.

75. The combination with a main base, of an adding machine carried by said base, a typewriter base movable on said main base, a typewriter main frame mounted on said typewriter base, ribbon feeding devices and spacing mechanism carried by said typewriter main frame, a typewriter auxiliary frame movably mounted on said typewriter main frame and provided with impression devices, and a platen carried by said adding machine and co-operating with said adding machine and impression devices.

76. The combination with a main base, of an adding machine carried by said base, a typewriter base movable on said main base, a typewriter main frame movably mounted on said typewriter base, ribbon feeding devices and spacing mechanism carried by said typewriter main frame, a typewriter auxiliary frame movably mounted on said typewriter main frame and provided with impression devices, and a platen carried by said adding machine and co-operating with said adding machine and impression devices.

77. The combination with a main base, of an adding machine carried by said base, a typewriter base movable on said main base, a typewriter main frame pivotally mounted on said typewriter base, ribbon feeding devices and spacing mechanism carried by said typewriter main frame, a typewriter auxiliary frame movably mounted on said typewriter main frame and provided with impression devices, and a platen carried by said adding machine and co-operating with said adding machine and impression devices.

78. The combination with a main base, of an adding machine carried by said base, a typewriter base movable on said main base, a typewriter main frame movably mounted on said typewriter base, ribbon feeding devices and spacing mechanism carried by said typewriter main frame, a typewriter auxiliary frame movably mounted on said typewriter main frame and provided with impression devices, means governed by the movement of said typewriter main frame on said typewriter base for throwing said ribbon feeding devices out of operation, and a platen carried by said adding machine and co-operating with said adding machine and impression devices.

79. The combination with a main base, of an adding machine carried by said base, a typewriter base movable on said main base, a typewriter main frame pivotally mounted on said typewriter base, ribbon feeding devices and spacing mechanism carried by said typewriter main frame, a typewriter auxiliary frame movably mounted on said typewriter main frame and provided with impression devices, means governed by the movement of said typewriter main frame on said typewriter base for throwing said ribbon feeding devices out of operation, and a platen carried by said adding machine and co-operating with said adding machine and impression devices.

80. The combination with a main base, of an adding machine carried by said base, a carriage for said adding machine, a typewriter carriage mounted on said main base and connected with said adding machine carriage, a typewriter base movable on said typewriter carriage, a typewriter main frame mounted on said typewriter base, ribbon feeding devices carried by said typewriter main frame, a typewriter auxiliary frame movably carried by said typewriter main frame and provided with impression devices, and a platen carried by said adding machine carriage and co-operating with said adding machine and said impression devices.

81. The combination with a main base, of an adding machine carried by said base, a carriage for said adding machine, a typewriter carriage mounted on said main base and connected with said adding machine carriage, a typewriter base movable on said typewriter carriage, a typewriter main frame movably mounted on said typewriter base, ribbon feeding devices carried by said typewriter main frame, a typewriter auxiliary frame movably carried by said typewriter main frame and provided with impression devices, and a platen carried by said adding machine carriage and co-operating with said adding machine and said impression devices.

82. The combination with a main base, of an adding machine carried by said base, a carriage for said adding machine, a typewriter carriage mounted on said main base and connected with said adding machine carriage, a typewriter base movable on said typewriter carriage, a typewriter main frame pivotally mounted on said typewriter base, ribbon feeding devices carried by said typewriter main frame, a typewriter auxiliary frame movably carried by said typewriter main frame and provided with impression devices, and a platen carried by said adding machine carriage and co-operating with said adding machine and said impression devices.

83. The combination with a main base, of an adding machine carried by said base, a carriage for said adding machine, a typewriter carriage mounted on said main base and connected with said adding machine carriage, a typewriter base movable on said typewriter carriage, a typewriter frame movably mounted on said typewriter base, ribbon feeding and impression devices carried by said frame, means governed by the movement of said frame on said typewriter base for throwing said ribbon feeding devices out of operation, and a platen carried by said adding machine carriage and co-operating with said adding machine and said impression devices.

84. The combination with a main base, of an adding machine carried by said base, a carriage for said adding machine, a typewriter carriage mounted on said main base and connected with said adding machine carriage, a typewriter base movable on said typewriter carriage, a typewriter frame pivotally mounted on said typewriter base, ribbon feeding and impression devices carried by said frame, means governed by the movement of said frame on said typewriter base for throwing said ribbon feeding devices out of operation, and a platen carried by said adding machine carriage and co-operating with said adding machine and said impression devices.

85. The combination with a main base, of an adding machine carried by said base, a carriage for said adding machine, a typewriter carriage carried by said main base and connected with said adding machine carriage, a typewriter base mounted on said typewriter carriage, a typewriter main frame movably mounted on said typewriter base, ribbon feeding devices carried by said typewriter main frame, a typewriter auxiliary frame movably mounted on said typewriter main frame and provided with impression devices, means governed by the movement of said main frame on said typewriter base for throwing said ribbon feeding devices out of operation, and a platen carried by said adding machine carriage and co-operating with said adding machine and impression devices.

86. The combination with a main base, of an adding machine carried by said base, a carriage for said adding machine, a typewriter carriage carried by said main base and connected with said adding machine carriage, a typewriter base mounted on said typewriter carriage, a typewriter main frame pivotally mounted on said typewriter base, ribbon feeding devices carried by said typewriter main frame, a typewriter auxiliary frame movably mounted on said typewriter main frame and provided with impression devices, means governed by the movement of said main frame on said typewriter base for throwing said ribbon feeding devices out of operation, and a platen carried by said adding machine carriage and co-operating with said adding machine and impression devices.

87. The combination with a main base, of an adding machine carried thereby, a carriage for said adding machine, a typewriter carriage carried by said main base and connected with said adding machine carriage, a typewriter base longitudinally movable on said typewriter carriage, a typewriter main frame mounted on said typewriter base, spacing mechanism carried by said main frame, a typewriter auxiliary frame movably mounted on said main frame and provided with impression devices, and a platen carried by said adding machine carriage and co-operating with said adding machine and impression devices.

88. The combination with a main base, of an adding machine carried thereby, a carriage for said adding machine, a typewriter carriage carried by said main base and connected with said adding machine carriage, a typewriter base longitudinally movable on said typewriter carriage, a typewriter main frame movably mounted on said typewriter base, spacing mechanism carried by said main frame, a typewriter auxiliary frame movably mounted on said main frame and provided with impression devices, and a platen carried by said adding machine carriage and co-operating with said adding machine and impression devices.

89. The combination with a main base, of an adding machine carried thereby, a carriage for said adding machine, a typewriter carriage carried by said main base and connected with said adding machine carriage, a typewriter base movably mounted on said typewriter carriage, a typewriter main frame pivotally mounted on said typewriter base, spacing mechanism carried by said main frame, a typewriter auxiliary frame movably mounted on said main frame and provided with impression devices, and a platen carried by said adding machine carriage and co-operating with said adding machine and impression devices.

90. The combination with a main base, of an adding machine carried by said base, a carriage for said adding machine, a typewriter carriage movable on said main base and connected with said adding machine carriage, a typewriter base movable on said typewriter carriage, a typewriter main frame mounted on said typewriter base, ribbon feeding devices and spacing mechanism carried by said main frame, a typewriter auxiliary frame movably mounted on said main frame and provided with impression devices, and a platen carried by said adding machine carriage and co-operating with said adding machine and impression devices.

91. The combination with a main base, of an adding machine carried by said base, a carriage for said adding machine, a typewriter carriage movable on said main base and connected with said adding machine carriage, a typewriter base movable on said typewriter carriage, a typewriter main frame movably mounted on said typewriter base, ribbon feeding devices and spacing mechanism carried by said main frame, a typewriter auxiliary frame movably mounted on said main frame and provided with impression devices, and a platen carried by said adding machine carriage and co-operating with said adding machine and impression devices.

92. The combination with a main base, of an adding machine carried by said base, a carriage for said adding machine, a typewriter carriage movable on said main base and connected with said adding machine carriage, a typewriter base movable on said typewriter carriage, a typewriter main frame pivotally mounted on said typewriter base, ribbon feeding devices and spacing mechanism carried by said main frame, a typewriter auxiliary frame movably mounted on said main frame and provided with impression devices, and a platen carried by said adding machine carriage and co-operating with said adding machine and impression devices.

93. The combination with an adding machine, of typewriting mechanism, a paper roll adapted to be moved in one position to co-operate with said adding machine and in another to co-operate with said typewriting mechanism, and means controlled by the movement of said roll for locking it against rotation.

94. The combination with an adding machine, of typewriting mechanism, a paper roll adapted to be moved in one position to co-operate with said adding machine and in another to co-operate with said typewriting mechanism, and means controlled by the movement of said roll for yieldingly locking it against rotation.

95. The combination with an adding machine, of typewriting mechanism, a paper roll adapted to be moved in one position to co-operate with said adding machine and in another to co-operate with said typewriting mechanism, a toothed wheel secured to said roll, a pawl for said wheel, and means for automatically throwing said pawl into and out of engagement with said wheel.

96. The combination with an adding machine, of typewriting mechanism, a paper roll adapted to be moved in one position to co-operate with said adding machine and in another to co-operate with said typewriting mechanism, a toothed wheel secured to said roll, a pawl for said wheel, and a cam for automatically throwing said pawl into and out of engagement with said wheel.

97. The combination with an adding machine, of typewriting mechanism, a carriage for said adding machine provided with a paper roll, means for pivotally moving said paper roll into position to co-operate with said typewriting mechanism, and means controlled by the pivotal movement of said roll for locking it against rotation.

98. The combination with an adding machine, of typewriting mechanism, a carriage for said adding machine provided with a paper roll, means for pivotally moving said paper roll into position to co-operate with said typewriting mechanism, and means controlled by the pivotal movement of said roll for yieldingly locking it against rotation.

In testimony whereof, I have hereunto set my hand and affixed my seal in the presence of the two subscribing witnesses.

EDWIN BEECHER CRAM. [L. S.]

Witnesses:
ADOLPHUS G. MEIER,
JAMES H. BRYSON.